US010470117B2

(12) United States Patent
Hampel et al.

(10) Patent No.: US 10,470,117 B2
(45) Date of Patent: Nov. 5, 2019

(54) CONNECTIVITY TO A LOCAL AREA NETWORK VIA A CELLULAR RADIO ACCESS TECHNOLOGY

(71) Applicant: QUALCOMM Incorporated, San Diego, CA (US)

(72) Inventors: Karl Georg Hampel, New York, NY (US); Vincent Douglas Park, Budd Lake, NJ (US); Hong Cheng, Basking Ridge, NJ (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 15/265,640

(22) Filed: Sep. 14, 2016

(65) Prior Publication Data
US 2017/0303189 A1    Oct. 19, 2017

Related U.S. Application Data

(60) Provisional application No. 62/322,130, filed on Apr. 13, 2016.

(51) Int. Cl.
*H04W 48/20* (2009.01)
*H04W 48/16* (2009.01)
(Continued)

(52) U.S. Cl.
CPC ........... *H04W 48/20* (2013.01); *H04W 8/082* (2013.01); *H04W 48/16* (2013.01); *H04W 76/16* (2018.02);
(Continued)

(58) Field of Classification Search
CPC ... H04W 48/16; H04W 48/20; H04W 76/028; H04W 94/12
(Continued)

(56) References Cited

U.S. PATENT DOCUMENTS

2011/0310799 A1* 12/2011 Horn ................... H04W 76/10
370/328
2013/0301522 A1* 11/2013 Krishna ............. H04L 61/2528
370/328

FOREIGN PATENT DOCUMENTS

EP          3057374 A1    8/2016
WO    WO-2010127683 A1   11/2010
WO    WO-2015052917 A1    4/2015

OTHER PUBLICATIONS

3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 8)", 3GPP Technical Specification, Dec. 1, 2008, 219 pgs., 3GPP TS 23.401, V8.4.0, XP050363626, 3rd Generation Partnership Project, Sophia-Antipolis Cedex, France.
(Continued)

*Primary Examiner* — Kouroush Mohebbi
(74) *Attorney, Agent, or Firm* — Holland & Hart LLP

(57) ABSTRACT

Methods, systems, and devices for wireless communication are described. A user equipment (UE) may establish connectivity to a local area network using cellular radio access technology (RAT). The UE may establish a signaling radio link with a cellular access node (AN) via a cellular RAT. The UE may transmit a connectivity request to a network node via the signaling radio link. The connectivity request may specify a connectivity type for establishing connectivity to a LAN. Based at least in part on an acceptance of the connectivity request, the UE may establish a data radio link with the cellular AN. In an example, the acceptance of the connectivity request may include at least one parameter for configuring the connectivity to the LAN. The UE may then establish a data flow for exchanging data link layer packets with the LAN via the data radio link.

50 Claims, 22 Drawing Sheets

(51) Int. Cl.
*H04W 8/08* (2009.01)
*H04W 76/19* (2018.01)
*H04W 76/16* (2018.01)
*H04W 84/12* (2009.01)
*H04W 76/12* (2018.01)
*H04W 76/18* (2018.01)
*H04W 48/18* (2009.01)

(52) U.S. Cl.
CPC ............ *H04W 76/19* (2018.02); *H04W 48/18* (2013.01); *H04W 76/12* (2018.02); *H04W 76/18* (2018.02); *H04W 84/12* (2013.01)

(58) Field of Classification Search
USPC ........................................................ 370/338
See application file for complete search history.

(56) References Cited

OTHER PUBLICATIONS

ISA/EP, International Search Report and Written Opinion of the International Searching Authority, Int'l Application No. PCT/US2017/020915, dated May 17, 2017, European Patent Office, Rijswijk, NL, 18 pgs.
Nokia Siemens Networks et al., "IP Connectivity Issues in Local IP Access", 3GPP TSG SA WG2 Meeting #75, TD S2-096012, Kyoto, Japan, Aug. 31-Sep. 4, 2009, 4 pgs., XP050397315, 3rd Generation Partnership Project.
3GPP, "3rd Generation Partnership Project; Tectmical Specification Group Core Network and Terminals; Non-Access-Stratum (NAS) Protocol for Evolved Packet System (EPS); Stage 3; D (Release 13)," 3GPP Technical Specification, Mar. 18, 2016, 414 pages, 3GPP TS 24.301 V13.5.0, XP051088177, 3rd Generation Partnership Project, Sophia-Antipolis Valbonne, France.
IPEA/EP, Second Written Opinion of the International Preliminary Examining Authority, Int'l Application No. PCT/US2017/020915, dated Feb. 27, 2018, European Patent Office, Munich, DE, 9 pgs.

* cited by examiner

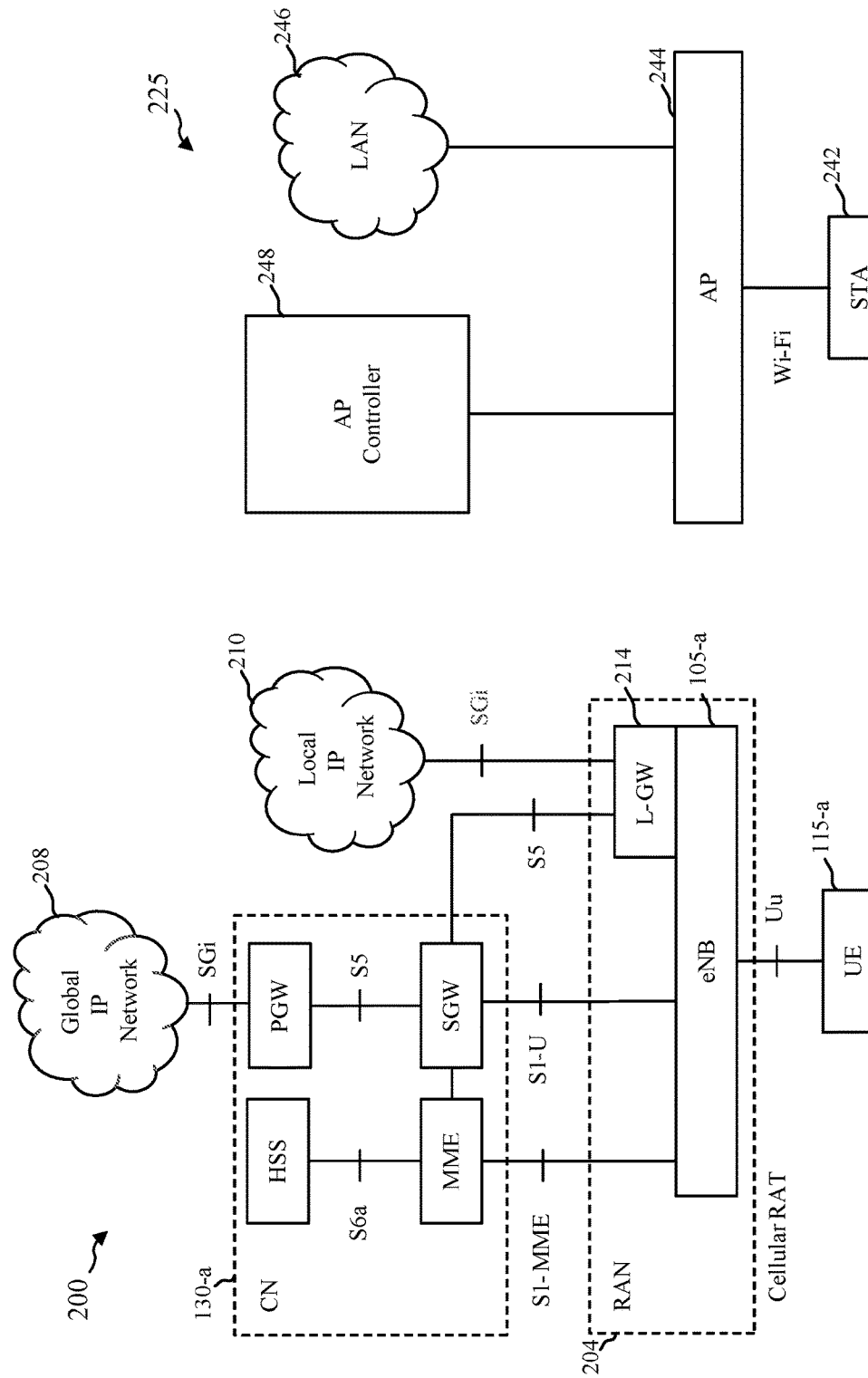

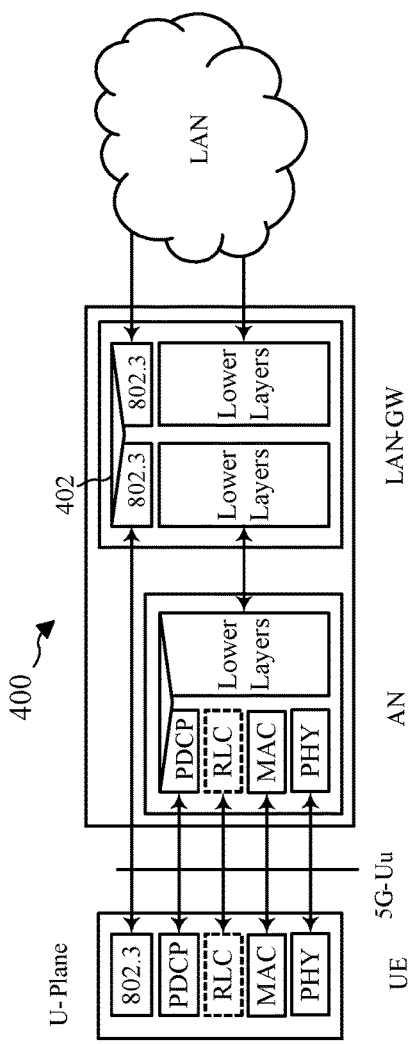
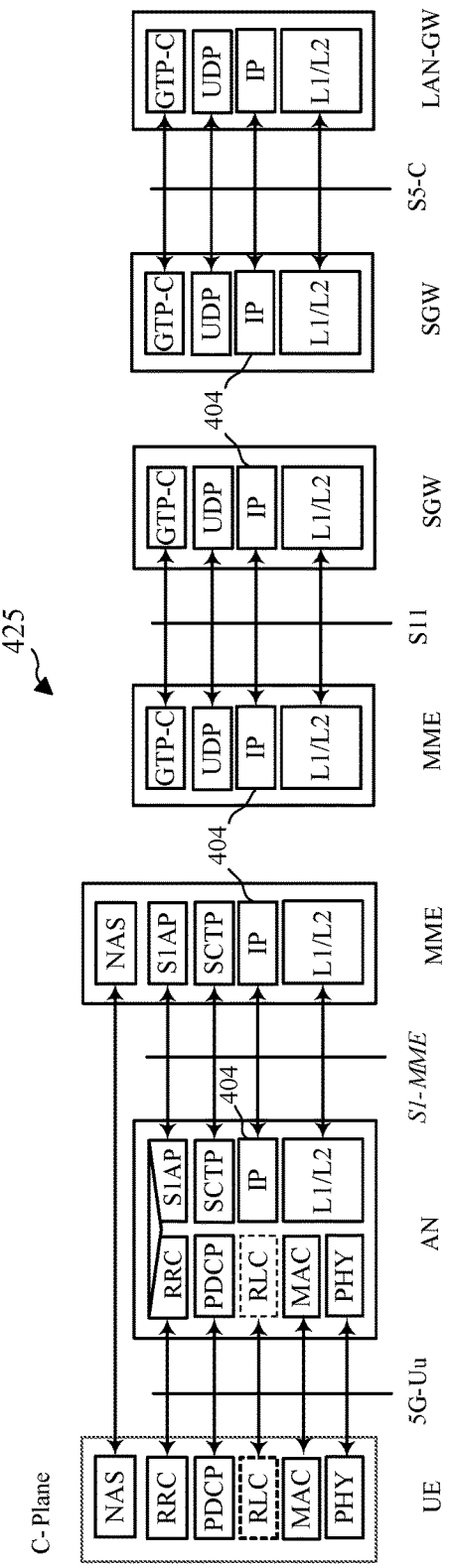
FIG. 4A
FIG. 4B

CONNECTIVITY TO A LOCAL AREA NETWORK VIA A CELLULAR RADIO ACCESS TECHNOLOGY

CROSS REFERENCES

The present Application for Patent claims priority to U.S. Provisional Patent Application No. 62/322,130 by Hampel, et al., entitled "Connectivity to a Local Area Network via a Cellular Radio Access Technology," filed Apr. 13, 2016, assigned to the assignee hereof, and is hereby expressly incorporated by reference herein in its entirety.

BACKGROUND

The following relates generally to wireless communication, and more specifically to connecting to a local area network (LAN) via a cellular radio access technology (RAT).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Conventional packet access systems allow mobile devices to connect to and exchange Internet Protocol (IP) packets with IP networks. These conventional systems have primarily been developed for large scale deployments by mobility operators. There also are a number of LAN-based packet access systems that use IEEE-802-based protocols, but conventional systems have not been deployed in smaller-scale environments, such as enterprises, factories and other types of private premises. With increasing performance of cellular RATs, it would be desirable to use these cellular RATs in a LAN-based access system.

SUMMARY

A user equipment (UE) may establish connectivity to a local area network (LAN) using a cellular radio access technology (RAT), where the UE may establish a signaling radio link with a cellular access node (AN) via the cellular RAT. The UE may transmit a connectivity request to a network node via the signaling radio link. The connectivity request may specify a connectivity type for establishing connectivity to a LAN. Based at least in part on an acceptance of the connectivity request, the UE may establish a data radio link with the cellular AN. In an example, the acceptance of the connectivity request may include at least one parameter for configuring the connectivity to the LAN. The UE may then establish a data flow for exchanging data link layer packets with the LAN via the data radio link.

A method of wireless communication is described. The method may include establishing, by a UE, a signaling radio link with a cellular AN via a cellular RAT, transmitting, to a network node via the signaling radio link, a connectivity request comprising a connectivity type for establishing connectivity to a LAN, establishing a data radio link with the cellular AN based at least in part on an acceptance of the connectivity request, wherein the acceptance of the connectivity request comprises at least one parameter for configuring the connectivity to the LAN and establishing a data flow for exchanging data link layer packets with the LAN via the data radio link.

An apparatus for wireless communication is described. The apparatus may include means for establishing, by a UE, a signaling radio link with a cellular AN via a cellular RAT, means for transmitting, to a network node via the signaling radio link, a connectivity request comprising a connectivity type for establishing connectivity to a LAN, means for establishing a data radio link with the cellular AN based at least in part on an acceptance of the connectivity request, wherein the acceptance of the connectivity request comprises at least one parameter for configuring the connectivity to the LAN and means for establishing a data flow for exchanging data link layer packets with the LAN via the data radio link.

Another apparatus is described. The apparatus may include a processor, memory in electronic communication with the processor, and instructions stored in the memory. The instructions may be operable to cause the processor to establish, by a UE, a signaling radio link with a cellular AN via a cellular RAT, transmit, to a network node via the signaling radio link, a connectivity request comprising a connectivity type for establishing connectivity to a LAN, establish a data radio link with the cellular AN based at least in part on an acceptance of the connectivity request, wherein the acceptance of the connectivity request comprises at least one parameter for configuring the connectivity to the LAN and establish a data flow for exchanging data link layer packets with the LAN via the data radio link.

A non-transitory computer readable medium for wireless communication is described. The non-transitory computer-readable medium may include instructions to cause a processor to establish, by a UE, a signaling radio link with a cellular AN via a cellular RAT, transmit, to a network node via the signaling radio link, a connectivity request comprising a connectivity type for establishing connectivity to a LAN, establish a data radio link with the cellular AN based on an acceptance of the connectivity request, where the acceptance of the connectivity request comprises at least one parameter for configuring the connectivity to the LAN and establish a data flow for exchanging data link layer packets with the LAN via the data radio link.

Some examples of the method, apparatus, or non-transitory computer-readable medium described above may further include processes, features, means, or instructions for transmitting, to the network node via the signaling radio link, the at least one parameter, where the at least one parameters is from the group consisting of: a physical address of the UE, an Ethernet frame type, and an access point name.

Some examples of the method, apparatus, or non-transitory computer-readable medium described above may further include processes, features, means, or instructions for transmitting a second connectivity request comprising a second connectivity type for establishing connectivity to one of the LAN and a second LAN. Some examples of the method, apparatus, or non-transitory computer-readable medium described above may further include processes, features, means, or instructions for establishing a second data radio link with the cellular AN based on an acceptance of the second connectivity request. Some examples of the method, apparatus, or non-transitory computer-readable medium described above may further include processes, features, means, or instructions for establishing a second data flow for exchanging second data link layer packets with the LAN or the second LAN via the second data radio link.

Some examples of the method, apparatus, or non-transitory computer-readable medium described above may further include processes, features, means, or instructions for transmitting a second connectivity request comprising an Internet Protocol (IP) packet data network (PDN) type. Some examples of the method, apparatus, or non-transitory computer-readable medium described above may further include processes, features, means, or instructions for establishing a second data radio link with the cellular AN based on an acceptance of the second connectivity request. Some examples of the method, apparatus, or non-transitory computer-readable medium described above may further include processes, features, means, or instructions for establishing a second data flow for exchanging second data link layer packets with an IP network via the second data radio link.

In some examples of the method, apparatus, or non-transitory computer-readable medium described above, the second data flow is associated with an IP address of the UE. In some examples of the method, apparatus, or non-transitory computer-readable medium described above, the acceptance of the connectivity request is based on the at least one parameter. In some examples of the method, apparatus, or non-transitory computer-readable medium described above, the connectivity request comprises the at least one parameter. In some examples of the method, apparatus, or non-transitory computer-readable medium described above, the data flow is associated with a virtual LAN (VLAN) tag. Some examples of the method, apparatus, or non-transitory computer-readable medium described above may further include processes, features, means, or instructions for establishing a second data flow based on the connectivity request, where the second data flow is associated with a physical address of the UE and a second VLAN tag.

Some examples of the method, apparatus, or non-transitory computer-readable medium described above may further include processes, features, means, or instructions for establishing a second data radio link, where the second data flow is associated with the second data radio link. Some examples of the method, apparatus, or non-transitory computer-readable medium described above may further include processes, features, means, or instructions for transmitting the first VLAN tag and the second VLAN tag to the network node.

A method of wireless communication is described. The method may include establishing, by a cellular AN, a signaling radio link with a UE via a cellular RAT, receiving, via the signaling radio link, a connectivity request for establishing connectivity to a LAN, forwarding the connectivity request to a network node, establishing a data radio link with the UE based at least in part on receiving an acceptance of the connectivity request from the network node, wherein the acceptance of the connectivity request comprises at least one parameter for configuring the connectivity to the LAN, and forwarding data link layer packets of a data flow between the data radio link and a bridging function to the LAN.

An apparatus for wireless communication is described. The apparatus may include means for establishing, by a cellular AN, a signaling radio link with a UE via a cellular RAT, means for receiving, via the signaling radio link, a connectivity request for establishing connectivity to a LAN, means for forwarding the connectivity request to a network node, means for establishing a data radio link with the UE based at least in part on receiving an acceptance of the connectivity request from the network node, wherein the acceptance of the connectivity request comprises at least one parameter for configuring the connectivity to the LAN and means for forwarding data link layer packets of a data flow between the data radio link and a bridging function to the LAN.

Another apparatus is described. The apparatus may include a processor, memory in electronic communication with the processor, and instructions stored in the memory. The instructions may be operable to cause the processor to establish, by a cellular AN, a signaling radio link with a UE via a cellular RAT, receive, via the signaling radio link, a connectivity request for establishing connectivity to a LAN, forward the connectivity request to a network node, establish a data radio link with the UE based at least in part on receiving an acceptance of the connectivity request from the network node, wherein the acceptance of the connectivity request comprises at least one parameter for configuring the connectivity to the LAN and forward data link layer packets of a data flow between the data radio link and a bridging function to the LAN.

A non-transitory computer readable medium for wireless communication is described. The non-transitory computer-readable medium may include instructions to cause a processor to establish, by a cellular AN, a signaling radio link with a UE via a cellular RAT, receive, via the signaling radio link, a connectivity request for establishing connectivity to a LAN, forward the connectivity request to a network node, establish a data radio link with the UE based on receiving an acceptance of the connectivity request from the network node, where the acceptance of the connectivity request comprises at least one parameter for configuring the connectivity to the LAN and forward data link layer packets of a data flow between the data radio link and a bridging function to the LAN.

Some examples of the method, apparatus, or non-transitory computer-readable medium described above may further include processes, features, means, or instructions for transmitting, to the network node, a physical address of the UE. Some examples of the method, apparatus, or non-transitory computer-readable medium described above may further include processes, features, means, or instructions for configuring the bridging function for communicating to the LAN data link layer packets that comprise the physical address.

Some examples of the method, apparatus, or non-transitory computer-readable medium described above may further include processes, features, means, or instructions for transmitting, to the network node, a physical address of the UE. Some examples of the method, apparatus, or non-transitory computer-readable medium described above may further include processes, features, means, or instructions for configuring the bridging function for communicating to the LAN data link layer packets that comprise the physical address and a first VLAN tag.

Some examples of the method, apparatus, or non-transitory computer-readable medium described above may further include processes, features, means, or instructions for establishing a second data radio link. Some examples of the method, apparatus, or non-transitory computer-readable medium described above may further include processes, features, means, or instructions for configuring the second bridging function for communicating second data link layer packets that comprise the physical address and a second VLAN tag. Some examples of the method, apparatus, or non-transitory computer-readable medium described above may further include processes, features, means, or instructions for forwarding the second data link layer packets of a second data flow between the second data radio link and a second bridging function to the LAN.

Some examples of the method, apparatus, or non-transitory computer-readable medium described above may further include processes, features, means, or instructions for receiving and forwarding a second connectivity request to the network node. Some examples of the method, apparatus, or non-transitory computer-readable medium described above may further include processes, features, means, or instructions for establishing a second data radio link based on receiving an acceptance of the second connectivity request from the network node. Some examples of the method, apparatus, or non-transitory computer-readable medium described above may further include processes, features, means, or instructions for forwarding second data link layer packets of a second data flow between the second data radio link and a second bridging function.

Some examples of the method, apparatus, or non-transitory computer-readable medium described above may further include processes, features, means, or instructions for transmitting, to the network node, a second physical address of the UE associated with the second data flow, and configuring the second bridging function with the second physical address.

Some examples of the method, apparatus, or non-transitory computer-readable medium described above may further include processes, features, means, or instructions for receiving a second connectivity request for establishing PDN-connectivity. Some examples of the method, apparatus, or non-transitory computer-readable medium described above may further include processes, features, means, or instructions for forwarding the second connectivity request to the network node. Some examples of the method, apparatus, or non-transitory computer-readable medium described above may further include processes, features, means, or instructions for establishing a second data radio link based on receiving an acceptance of the second connectivity request from the network node. Some examples of the method, apparatus, or non-transitory computer-readable medium described above may further include processes, features, means, or instructions for forwarding second data link layer packets of a second data flow between the second data radio link and a routing function.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

FIGS. 2A-2B illustrate examples of wireless communications systems for providing packet data network (PDN) connectivity via a cellular RAT in accordance with aspects of the present disclosure;

FIGS. 4A-4B illustrates example user-plane and control-plane protocol stacks for providing LAN connectivity in accordance with aspects of the present disclosure;

DETAILED DESCRIPTION

The disclosed examples illustrate techniques for a user equipment (UE) establishing connectivity to a local area network (LAN) via a cellular radio access technology (RAT). The UE may coordinate with a cellular access node (AN) and one or more network nodes to establish a data flow between the UE and the LAN. In an example, the UE may establish a signaling radio link with a cellular AN via the cellular RAT and transmit a connectivity request to a network node via the signaling radio link. Based at least in part on an acceptance of the connectivity request, the UE may establish a data radio link with the cellular AN. The UE may then establish a data flow for exchanging data link layer packets with the LAN via the data radio link.

Aspects of the disclosure are initially described in the context of a wireless communication system for enabling a UE to establish connectivity to a LAN via a cellular RAT. The disclosure provides various examples of architecture for the wireless communication system and signaling flow between various devices within the architecture. Aspects of the disclosure are further illustrated by and described with reference to apparatus diagrams, system diagrams, and flowcharts that relate to connecting to a LAN via a cellular RAT.

Figure 1:
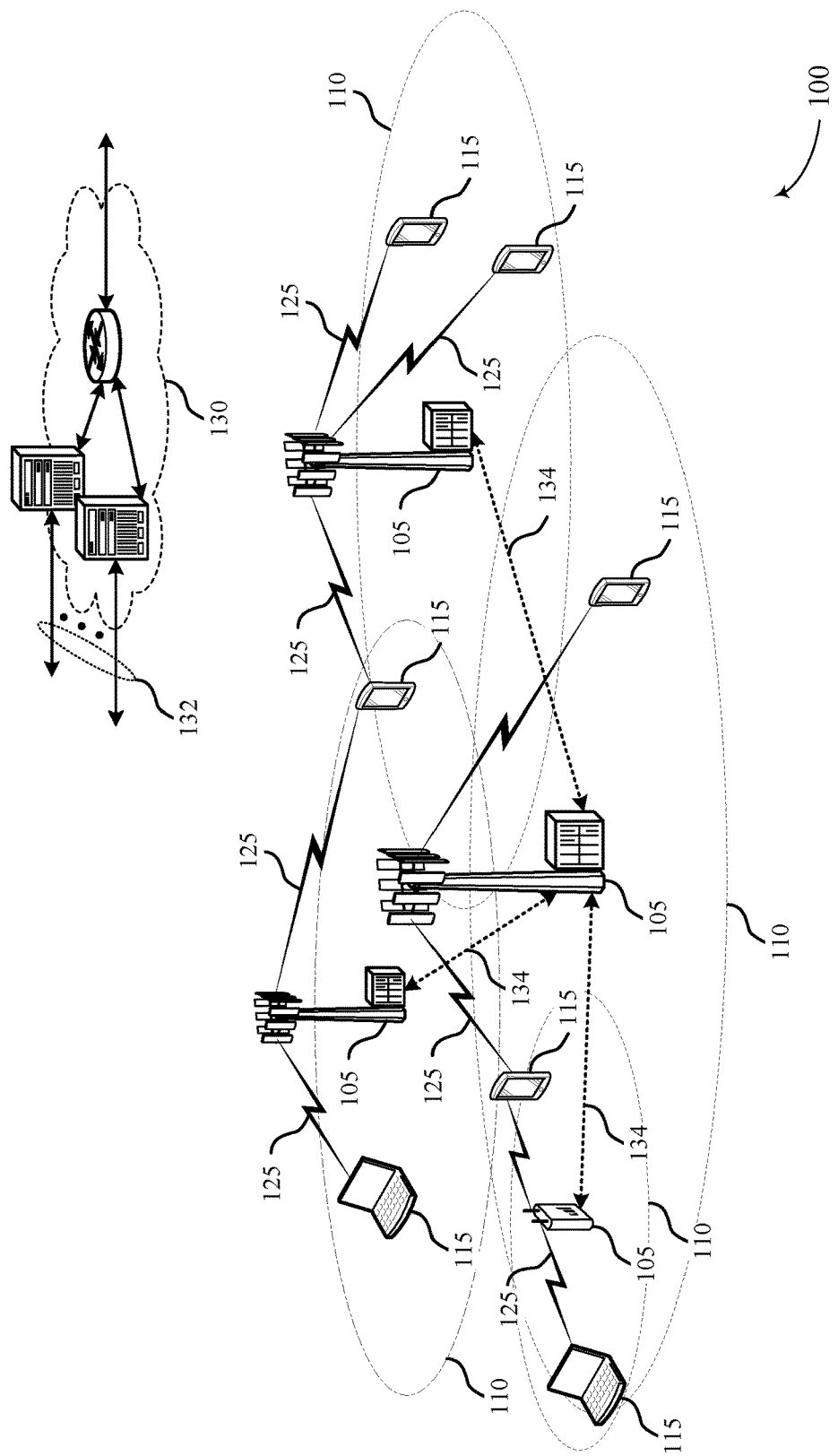
FIG. 1 illustrates an example of a wireless communications system that supports connectivity to a local area network (LAN) via a cellular radio access technology (RAT) in accordance with aspects of the present disclosure.

FIG. 1 illustrates an example of a wireless communications system 100 that supports connectivity to a LAN via a cellular radio access technology RAT in accordance with various aspects of the present disclosure. The wireless communications system 100 includes base stations 105, UEs 115, and a core network (CN) 130. In some cases, a base station 105 may be an example of a cellular AN, a network node, or the like. In some examples, the wireless communications system 100 may be a Long Term Evolution (LTE)/LTE-Advanced (LTE-A) network. The wireless communications system 100 may provide for establishing LAN connectivity between a UE and a LAN via a cellular AN.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the CN 130 and with one another. For example, base stations 105 may interface with the CN 130 through backhaul links 132 (e.g., S1, etc.). Base stations 105 may communicate with one another over backhaul links 134 (e.g., X2, etc.) either directly or indirectly (e.g., through CN 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the CN 130. The CN 130 may be an evolved packet core (EPC), which may include one or more network nodes. In an example, CN 130 may include at least one mobility management entity (MME), at least one serving gateway (SGW), and at least one packet data network (PDN) gateway (PGW). The MME, SGW, and PGW may be implemented as a single network node or may be separate network nodes. The MME may be the control node that processes the signaling between the UE 115 and the EPC. All user IP packets may be transferred through the SGW, which itself may be coupled with the PGW. The PGW may provide IP address allocation as well as other functions. The PGW may be coupled with the network operators IP services. The operators IP services may include the Internet, the Intranet, an IP Multimedia Subsystem (IMS), and a Packet-switched Streaming Service (PSS).

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in an eCC may comprise of one or multiple symbols. In some cases, the TTI duration (that is, the number of symbols in a TTI) may be variable.

The example wireless communications system 100 may implement a LAN-based packet access system using cellular RATs. In an example, UE 115 may coordinate with base station 105 and one or more network nodes of CN 130 to establish a data flow between the UE 115 and a LAN. In an example, the UE 115 may establish a signaling radio link with base station 105 via a cellular RAT and transmit a connectivity request to a network node of the CN 130 via the signaling radio link. Based at least in part on an acceptance of the connectivity request, the UE 115 may establish a data radio link with the base station 105. The UE 115 may then establish a data flow for exchanging data link layer packets with the LAN via the data radio link.

FIG. 2A illustrates an example of a wireless communications system 200 for connecting to both global and local IP networks via a cellular RAT, and FIG. 2B illustrates an example of a wireless communications system 225 for connecting to a LAN via a cellular RAT. Wireless communications systems 200 and 225 are examples of a wireless communications system 100 as described with reference to FIG. 1. Wireless communications system 200 may include base station 105-a, UE 115-a, and CN 130-a, which may be examples of the corresponding devices described with reference to FIG. 1. A base station 105 as described herein may be, for example, an AN or an eNB.

In an example, wireless communications system 200 enables connectivity to one or more IP-based networks (e.g., the Internet) and may be operated by a mobile network operator (MNO) for large-scale deployments (e.g., to provide IP packet access over a wide coverage area). Wireless communications system 200 may include a radio access network (RAN) 204 and a CN 130-a. The RAN 204 may include one or more base stations 105-a (e.g., ANs, NodeBs, eNodeBs, and the like) which support one or more cellular RATs to provide wireless connectivity to one or more UE 115-a (e.g., mobile terminals (MT)). Examples of cellular RATs include wideband code division multiple access (W-CDMA), LTE/LTE-A, 5G RATs, RATs using licensed or unlicensed spectrum, as well as combinations thereof. The RAN 204 may also include a local gateway (L-GW) 214 collocated with the base station 105-a. The L-GW 214 may provide an interface between the base station 105-a and the local IP network 210.

The CN 130-a may support control plane (C-plane) tasks (e.g., authentication, authorization, session management, policy control and charging) and user plane (U-plane) tasks (e.g., IP-traffic forwarding between a UE 115 and a global IP network 208). The CN 130-a may include one or more network nodes for performing C-plane and U-plane tasks, including a home subscriber server (HSS), a PGW, an SGW, and an MME.

Turning to FIG. 2B, wireless communications system 225 may leverage 802-based protocols defined by IEEE for providing a station (STA) 242 connectivity to a LAN 246 via an access point (AP) 244. Wireless communications system 225 may provide wireless connectivity via a variety of wireless technologies (e.g., Wi-Fi (802.11), WiMAX (802.16), Bluetooth (802.15.1), Zigbee (802.15.4), and the like). In an example, the wireless communications system 225 may communicate packets using a data link layer packet format such as, for example, Ethernet packet format (802.3). For Wi-Fi, AP 244 may support one or more wireless links to one or more STAs 242, and implement a LAN-bridging function to a distribution system that interconnects STA 242 to network services (e.g., to LAN 246). The distribution system of the AP 244 may be a distributed network of LAN bridges/switches that implement the 802.1-based bridging/switching protocol. The distributed network may also run a forwarding protocol (e.g., Rapid Spanning Tree Protocol (RSTP, 802.1D) or Shortest-Path Bridging protocol (SPB, 802.1aq)). The LAN-system may also support a CAPWAP architecture ("Control and Provisioning of Wireless APs", RFC 5415 to 5418). The wireless communications system 225 may have an AP controller 248 that supports C-plane protocols, enforces authentication, authorization, and accounting (AAA) services, and administers policy for wireless access.

In an example, the wireless communications system 225 may be deployed in a confined environment, such as, for example, an enterprise, a factory, and other types of private premises. Wireless communications system 225 may be used to provide broadband access offered by wireline operators. Wireless communications system 225 may run IP, or other protocols, on top of Ethernet. In factory automation networks, for example, proprietary protocols may run on top of Ethernet. For broadband access, Provider-Backbone-Bridging (PBB) may be used as defined by 802.1ah, which uses MAC-in-MAC encapsulation.

The examples described herein may utilize cellular RATs in a LAN-based packet-access system. While it is possible to deploy a complete cellular packet-access system side-by-side with an existing LAN-based packet-access system, such a deployment may not be economical. Further, LAN-based systems are based on the Ethernet packet format, while cellular systems presently use IP. Connectivity to LAN-based services via cellular RATs in conventional systems is difficult in many cases and impossible in others.

Figure 5:
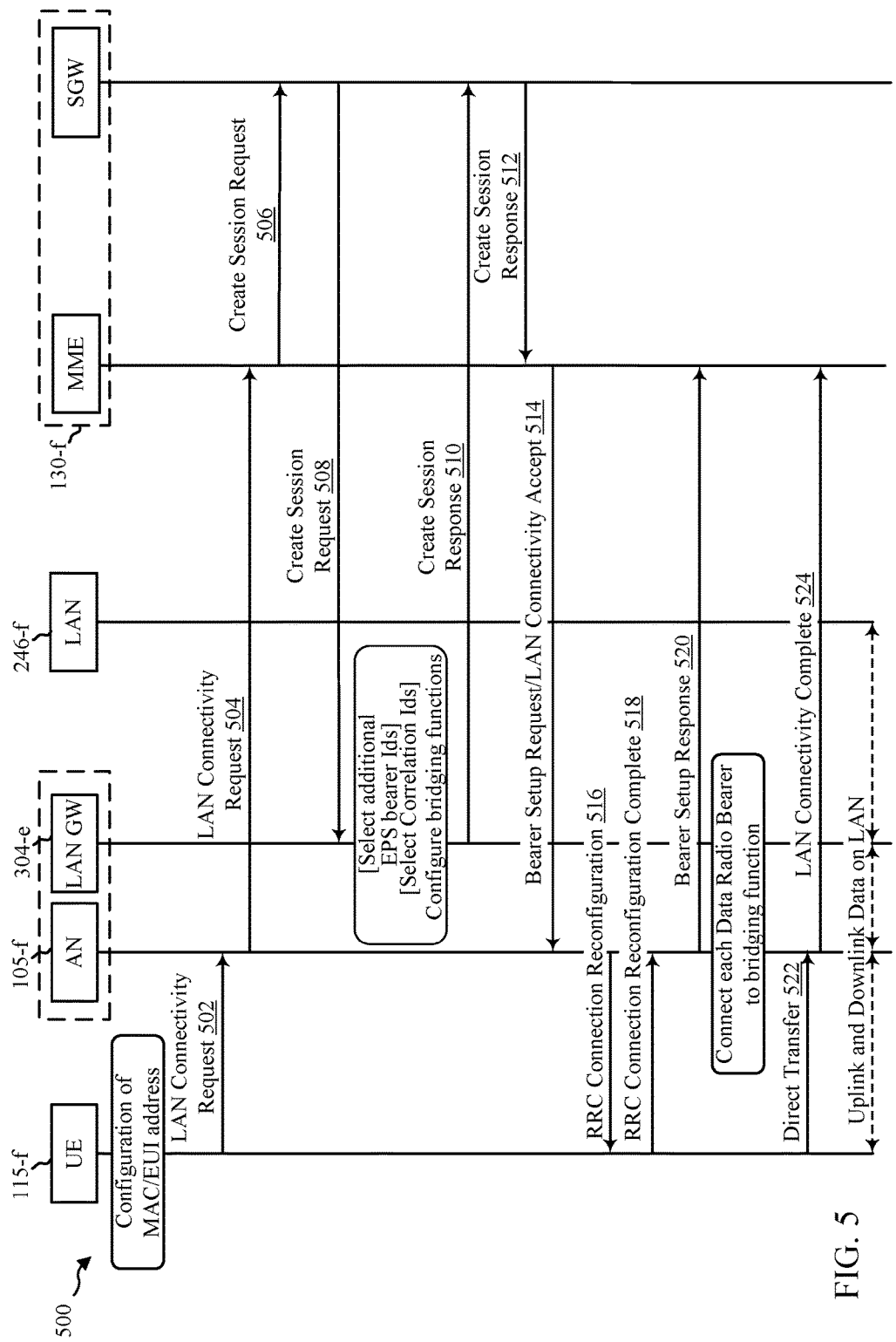
FIG. 5 illustrates an example signaling flow for establishment of LAN-connectivity via a cellular RAT in accordance with aspects of the present disclosure.
Figure 6:
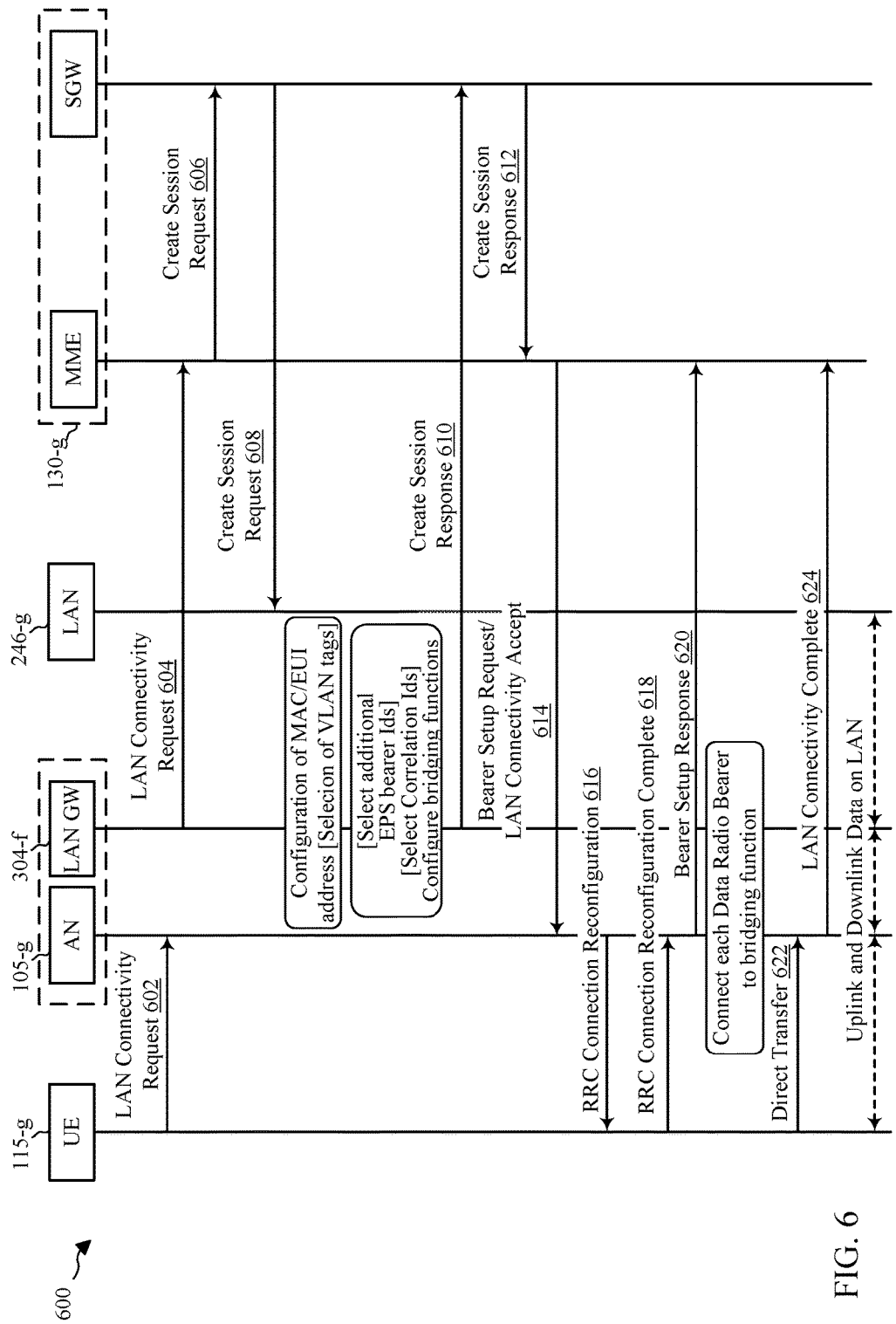
FIG. 6 illustrates an example signaling flow for establishment of LAN-connectivity via a cellular RAT in accordance with aspects of the present disclosure.
Figure 7:
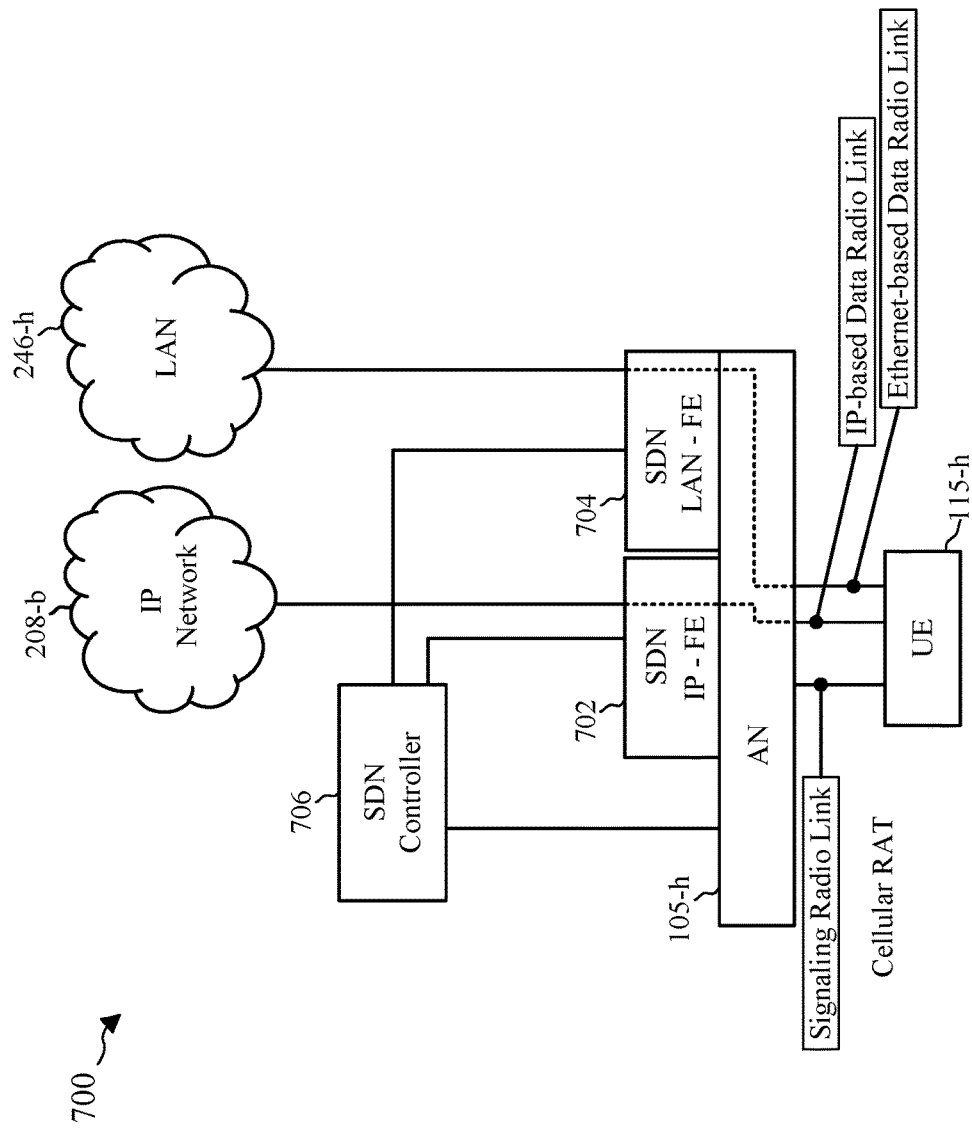
FIG. 7 illustrates an example of a wireless communications system having a software defined networking (SDN)-based architecture for connecting to a LAN via a cellular RAT in accordance with aspects of the present disclosure.
Figure 8:
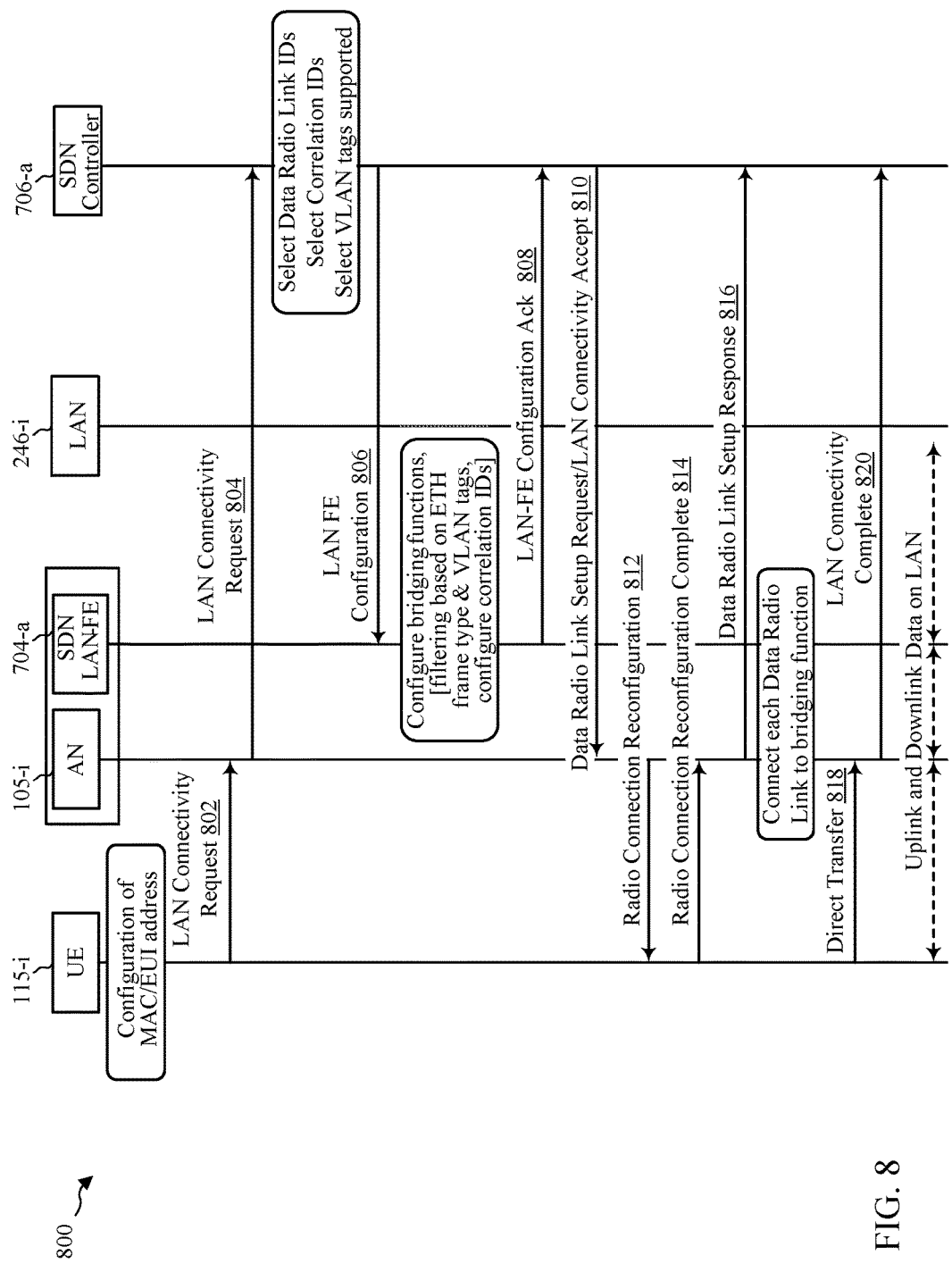
FIG. 8 illustrates an example signaling flow for establishment of LAN-connectivity via a cellular RAT in accordance with aspects of the present disclosure.

FIGS. 3-6 describe examples for providing LAN connectivity via a cellular RAT in architecture in accordance with 3GPP and 3GPP2, and FIGS. 7-8 describe examples for providing LAN connectivity via a cellular RAT in a software defined networking (SDN) architecture.

Figure 3B:
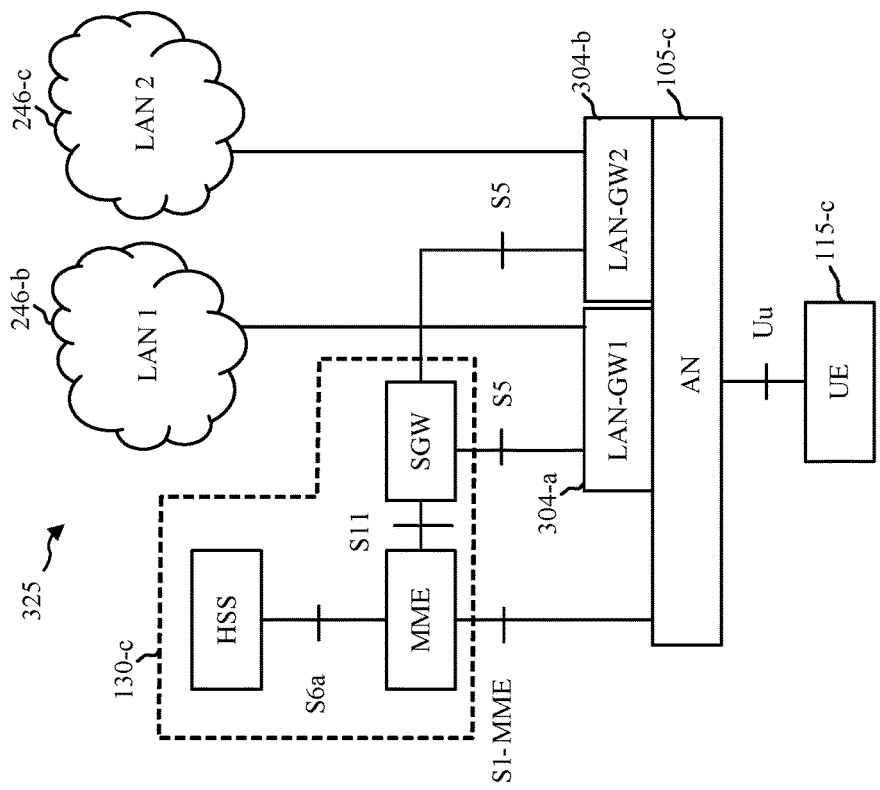
FIGS. 3A-3D illustrates example architectures of wireless communications systems that support cellular RAT integration into LAN systems in accordance with aspects of the present disclosure.
Figure 3A:
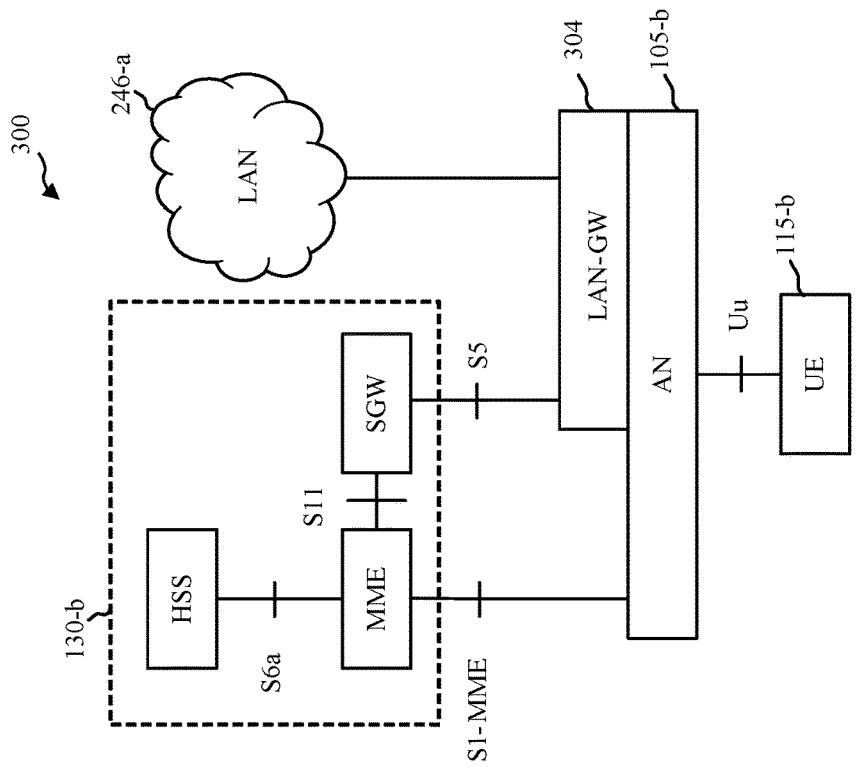
Figure 3D:
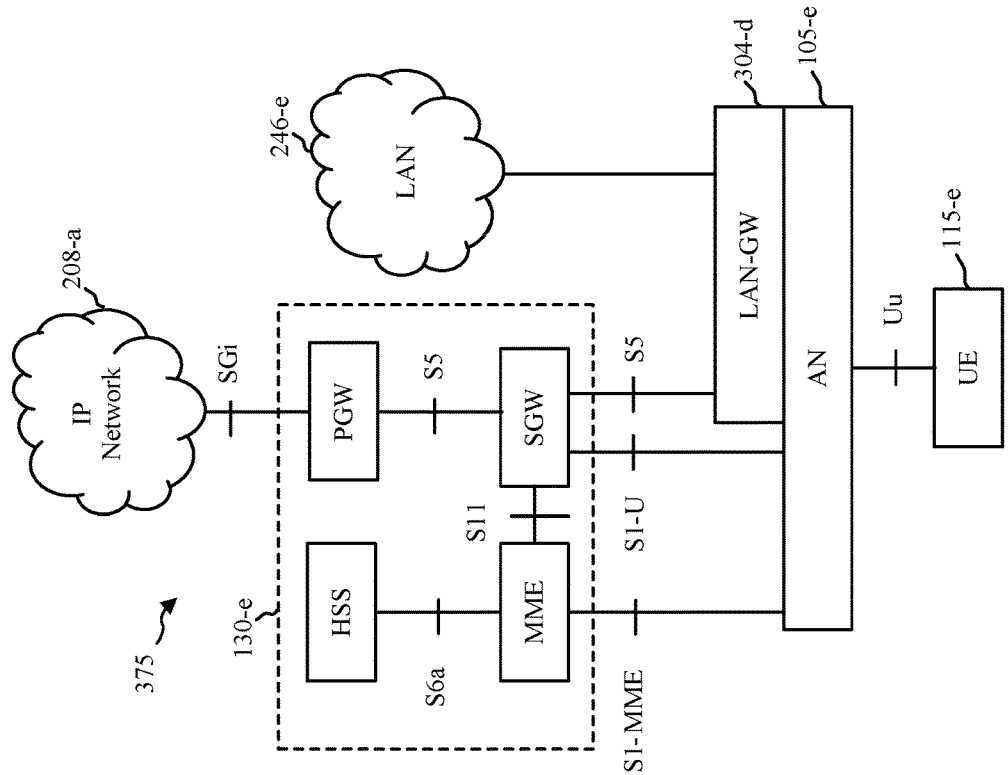
Figure 3C:
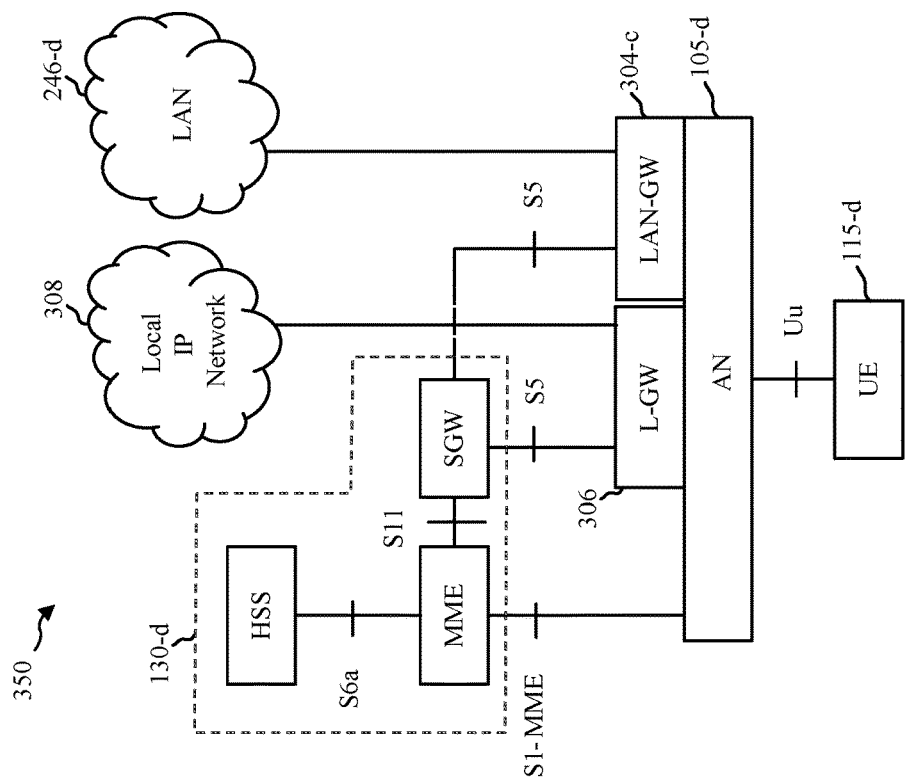

FIGS. 3A-3D illustrate example architectures of wireless communications systems 300, 325, 350, and 375 that support cellular RAT integration into LAN systems. In some cases, the example architectures may represent aspects of techniques performed by a UE 115, base station 105, and CN 130 as described with reference to FIGS. 1-2. Wireless communications systems 300, 325, 350, and 375 are examples of a wireless communications system 100 as described in FIGS. 1 and 2A-2B. In FIG. 3A, wireless communications system 300 provides UE 115-*b* with connectivity to LAN 246-*a* via AN 105-*b* and LAN gateway (LAN-GW) 304 by coordinating with CN 130-*b*. In FIG. 3B, wireless communications system 325 provides UE 115-*c* with simultaneous connectivity to LANs 246-*b* and 246-*c* via LAN-GWs 304-*a* and 304-*b* by coordinating with CN 130-*c*. In FIG. 3C, wireless communications system 350 provides UE 115-*d* with simultaneous connectivity to a LAN 246-*d* via LAN-GW 304-*c* and a local IP network 308 via L-GW 306 by coordinating with CN 130-*d*. In FIG. 3D, wireless communications system 375 provides UE 115-*e* with simultaneous connectivity to a LAN 246-*e* via LAN-GW 304-*d* and a global IP network 208-*a* via PGW of CN 130-*e*.

Each of wireless communications systems 300, 325, 350, and 375 includes an AN 105-*b*, 105-*c*, 105-*d*, 105-*e* that supports wireless data radio links with one or more UEs 115-*b*, 115-*c*, 115-*d*, 115-*e* via a cellular RAT. Each AN 105 may collocated with a LAN-GW 304.

FIGS. 4A-4B illustrate example U-plane and C-plane protocol stacks for providing LAN connectivity via wireless communications systems 300, 325, 350, and 375. As seen in FIG. 4A, U-plane protocol stack 400 supports a data link layer 402 (e.g., Ethernet layer) on top of a cellular RAT. Via the U-plane protocol stack 400, a UE 115 may exchange data link layer packets (e.g., Ethernet packets) on top of a wireless data link with a LAN-GW 304. The LAN-GW 304 may interface to a LAN 246 via an 802.1 bridging function. The wireless communications systems 300, 325, 350, and 375 may thus leverage LAN-based U-plane concepts to provide a UE 115 access to LAN-based services via the cellular RAT.

As seen in FIG. 4B, C-plane protocol stack 425 may run on top of an IP layer 404. Via the C-plane protocol stack 425, the UE 115 may retain cellular functions and communicate with an AN 105 via a cellular signaling radio link. The AN 105 may interface to C-plane nodes of the CN 130 (e.g., see CN 130-*a*, 130-*b*, 130-*c*, or 130-*d* described with reference to FIGS. 3A-3D). Example C-plane nodes include an MME, an HSS, a PGW, and an SGW. In an example, the AN 105 may connect to the MME via an S1-MME interface, and LAN-GW 304 and L-GW 306 may connect to the SGW via an S5 interface. In other examples, the C-plane nodes may be integrated into the LAN 246 as IP running on top of Ethernet. Protocol stacks different than depicted in FIGS. 4A-4B may be used as long as similar information is provided to the C-plane nodes.

FIG. 5 illustrates an example signaling flow 500 for establishment of LAN-connectivity via a cellular RAT. In some cases, signaling flow 500 may represent aspects of techniques performed by a UE 115, base station 105, and CN 130 as described with reference to FIGS. 1-2. The signaling flow 500 may be utilized in any of the wireless communications systems 300, 325, 350, and 375 depicted in FIGS. 3A-3D. For signaling flow 500, UE 115-*f* may have a pre-configured physical address, an example of which may be a MAC/extended unique identifier (EUI) address. The UE 115-*f* may have been manually configured, configured by CN 130-*f*, or configured in any other manner. Signaling flow 500 may include the following signaling for establishment of LAN-connectivity. The signaling may be performed in other orders, some signaling may be combined, and a message described as being sent in a particular signal may be sent in multiple signals at the same or other times.

The UE 115-*f* may establish a signaling radio link (e.g., an RRC connection) with AN 105-*f*. Once established, the UE 115-*f* may send a LAN connectivity request message 502 (e.g., a non-access stratum (NAS) LAN connectivity request message) to the AN 105-*f*. In an example, the connectivity request message may specify "Ethernet" as a PDN-type, include the MAC/EUI address of the UE 115-*f*, specify "Ethernet" as a frame type, identify one or more virtual LAN (VLAN) tags, and any combination thereof. If establishing connectivity to an IP-based network instead of LAN 246-*f*, the connectivity request message may specify "IP" as the PDN-type.

The AN 105-*f* inserts a network address of the LAN-GW 304-*e* into the connectivity request message and forwards the modified LAN connectivity request message 504 to the CN 130-*f*. In case the C-plane protocol stack 425 as described with reference to FIG. 4B is used, the network address of the LAN-GW 304-*e* may be an IP address. For example, the LAN-GW 304-*e* may be configured with an IP address. The AN 105-*f* may also modify the connectivity request message by inserting one or more VLAN tags.

A network node (e.g., MME) of the CN 130-*f* may create an evolved packet system bearer identifier (EPS-Bearer-ID) and generate a create session request message 506 that includes "Ethernet" as a PDN-type, the MAC/EUI address of the UE 115-*f*, "Ethernet" as a frame type, one or more VLAN tags, the LAN-GW address, the EPS-Bearer-ID, and any combination thereof. The MME of the CN 130-*f* may then send the create session request message to a second network node (e.g., SGW) of CN 130-*f*. In some examples, MME and SGW may be separate network nodes, and in others MME and SGW may be a single network node.

The SGW of CN 130-*f* may include a network address of the SGW in the create session request message and forward the modified create session request message 508 to the network address of the LAN-GW 304-*e*. The LAN-GW 304-*e* may cache, as an entry to configure its bridging function, the MAC/EUI address of UE 115-*f* with the EPS-Bearer-ID. The bridging function may use the cached entry to forward LAN-based data link layer packets (e.g., Ethernet packets) carrying the MAC/EUI address of the UE 115-*f* as a destination address to the cellular data radio link of the UE 115-*f*. The LAN-GW 304-*e* may further select and forward one or more correlation identifiers (IDs) and/or one or more additional EPS-Bearer-IDs to the AN 105-*f*.

The LAN-GW 304-*e* may send a create session response message 510 to the SGW of CN 130-*f* that includes the mapping between EPS-Bearer-ID, the correlation ID, and any VLAN tags. The SGW of CN 130-*f* may forward the create session response message 512 to the MME of CN 130-*f*. The create session response message may include the mapping between EPS-Bearer-ID, the correlation ID, and any VLAN tags.

The MME of CN 130-*f* may send a bearer setup request message 514 to the AN 105-*f* containing a LAN connectivity accept container (e.g., a NAS LAN connectivity accept container). The bearer setup request message may include the EPS-Bearer-ID and information for the AN 105-*f* to establish a data radio bearer (DRB) to the UE 115-*f*. The bearer setup request message may further contain the mapping between the EPS-Bearer-ID, the correlation ID, and any VLAN tags. The AN 105-*f* may use this mapping to establish a link to the LAN-GW 304-*e* for the EPS-bearer if, for example, the AN 105-*f* and LAN-GW 304-*e* are not collocated. For example, the AN 105-*f* may transmit a tunnel end-point address to the CN 130-*f* and establish a tunnel between the AN 105-*f* and the LAN-GW 304-*e* using the tunnel end-point address.

The AN 105-*f* may send an RRC connection reconfiguration message 516 to the UE 115-*f* indicating acceptance of the LAN connectivity request sent in the LAN connectivity request message 502. The RRC connection reconfiguration message 516 may contain at least one parameter for specifying a configuration of one or more data radio bearers (e.g., the MAC/EUI address which the UE 115-*f* may use to exchange data with the LAN 246-*f*, mapping to VLAN tags, an Ethernet frame type, an access point name, and the like). A data radio bearer (DRB) may also be referred to herein as a data radio link (DRL). Based on the RRC connection reconfiguration message, the UE 115-*f* may configure a DRB and map the DRB to the MAC/EUI address of UE 115-*f*. The UE 115-*f* may also map the DRB to any applicable VLAN tags. The UE 115-*f* may send an RRC connection reconfiguration complete message 518 to the AN 105-*f* indicating successful configuration of the DRB.

The AN 105-*f* may send a bearer setup response message 520 to the MME of CN 130-*f*. The AN 105-*f* and LAN-GW 304-*e* may use the correlation ID and the mapping of the correlation ID to the EPS-Bearer-ID to interconnect the DRB with a bridging function of the LAN-GW 304-*e* implemented for the MAC/EUI address of UE 115-*f*.

The UE 115-*f* may send a direct transfer NAS message 522 to the AN 105-*f* to signal successfully completion of LAN connectivity. The AN 105-*f* may forward a LAN connectivity complete message 524 to the MME of CN 130-*f* to complete establishment of a data flow for exchanging data link layer packets with the LAN 246-*f* via the DRB. The data flow may be associated with a physical address of the UE 115-*f* and a VLAN tag. The data flow may be, for example, a PDN connection.

After successful completion of signaling flows 500, the UE 115-*f* may send data link layer packets (e.g., Ethernet packets) to the LAN 246-*f* via the DRB. When a packet is received from UE 115-*f* on the DRB, the AN 105-*f* forwards the packet to the bridging function of the LAN-GW 304-*e*. The bridging function then forwards the received packets to the LAN 246-*f*. In the other direction, the LAN-GW 304-*e* may receive packets from the LAN 246-*f*. The LAN-GW 304-*e* may identify selected ones of the received packets having the MAC/EUI of UE 115-*f* as a destination address, and the bridging function may forward the selected packets to the AN 105-*f*. The AN 105-*f* may then communicate the selected packet to the UE 115-*f* via the DRB.

In some examples, the LAN-GW 304-*e* may support LAN-specific protocols to enable path discovery for the MAC/EUI address of UE 115-*f*. Examples may include the RSTP as defined by 802.1D, Shortest-Path-Bridging as defined by 802.1aq, Address Resolution Protocol (ARP) as defined by RFC 826, Neighbor Discovery Protocol (NDP) as defined by RFC 4861, and the like. Additionally or alternatively, the LAN-GW 304-*e* may encapsulate Ethernet packets of UE 115-*f* in IP. If encapsulated in IP, the IP packets may be tunneled from a local anchor at the LAN-GW 304-*e* (e.g., a Mobility Anchor Gateway as defined by Proxy Mobile IP (PMIP)) to a remote anchor (e.g., a Local Mobility Anchor defined by PMIP).

FIG. 6 illustrates an example signaling flow 600 for establishment of LAN-connectivity via a cellular RAT in accordance with examples. In some cases, signaling flow 500 may represent aspects of techniques performed by a UE 115, base station 105, and CN 130 as described with reference to FIGS. 1-2. The signaling flow 500 may be utilized in any of the wireless communications systems 300, 325, 350, and 375 described with reference to FIGS. 3A-3B.

Signaling flow 600 may include the following signaling for establishment of LAN-connectivity. The signaling may be performed in other orders, some signaling may be combined, and a message described as being sent in a particular signal may be sent in multiple signals at the same or other times.

UE 115-*g* may establish a signaling radio link (e.g., an RRC connection) with AN 105-*g*. Once established, the UE 115-*g* may send a LAN connectivity request message 602 (e.g., a NAS LAN connectivity request message) to the AN 105-*g*. In an example, the connectivity request message may specify "Ethernet" as a PDN-type and "Ethernet" as a frame type. If establishing connectivity to an IP-based network instead of LAN 246-*g*, the connectivity request message may specify "IP" as the PDN-type.

The AN 105-*g* inserts a network address of the LAN-GW 304-*f* into the LAN connectivity request message 602 and forwards the modified LAN connectivity request message 604 to a network node (e.g., MME) of CN 130-*g*. If, for example, the C-plane protocol stack 425 described with reference to FIG. 4B is used, the network address of LAN-GW 304-*f* may be an IP address. The AN 105-*g* may also modify the connectivity request message by inserting one or more VLAN tags.

The MME of CN 130-*g* may select an EPS-Bearer-ID and generate a create session request message 606 that includes "Ethernet" as a PDN-type, "Ethernet" as a frame type, the network address of the LAN-GW 304-*f*, and the EPS-Bearer-ID. The MME may send the generated create session request to a second network node (e.g., SGW) of CN 130-*g*. In some examples, MME and SGW may be separate network nodes, and in others MME and SGW may be a single network node.

The SGW of CN 130-*g* may modify the create session request to include a network address of the SGW, and forward the modified create session request message 608 to the network address of the LAN-GW 304-*f*. In an example, the LAN-GW 304-*f* may use the network address of the SGW for sending messages to the SGW on an S5 interface. In an example, the network address of the SGW may be an IP address.

The LAN-GW 304-*f* may create a physical address (e.g., MAC/EUI address) for the UE 115-*g*. The LAN-GW 304-*f* may cache, as an entry to configure its bridging function, the MAC/EUI address of UE 115-*g* with the EPS-Bearer-ID. The bridging function may use the bridging entry to forward data link layer packets (e.g., LAN-based Ethernet packets) carrying the physical address of the UE 115-*g* (e.g., a MAC/EUI address) as a destination address to the cellular data radio link associated with UE 115-*g*. The LAN-GW 304-*f* may also select and forward one or more correlation IDs and/or one or more additional EPS-Bearer-IDs to the AN 105-*g*. The LAN-GW 304-*f* and the AN 105-*g* may use the correlation ID for establishing a lower-layer link between AN 105-*g* and LAN-GW for an EPS bearer associated with EPS-Bearer-ID in case AN 105-*g* and LAN-GW 304-*f* are not collocated. For example, the AN 105-*g* may transmit a tunnel end-point address to the CN 130-*g* and establish a tunnel between the AN 105-*g* and the LAN-GW 304-*f* using the tunnel end-point address. The LAN-GW 304-*f* may then send to the SGW of CN 130-*g* a create session response message 610 including the EPS-Bearer-ID, the correlation ID, and the MAC/EUI address generated for the UE 115-*g*. The LAN-GW 304-*f* may also select and include one or more VLAN tags in the create session response message. The SGW of CN 130-*g* may forward the create session response message 612 to the MME of CN 130-*g*.

The MME may send a bearer setup request message 614 to the AN 105-*g* containing a connectivity accept container (e.g., a NAS LAN Connectivity Accept Container). The request message may include the EPS-Bearer-ID, the MAC/EUI address of the UE 115-*g*, and information for the AN 105-*g* to establish a DRB to UE 115-*g* (e.g., correlation ID, any applicable VLAN tags, and the like). The request message may contain the mapping between the EPS-Bearer-ID and the correlation ID. If the AN 105-*g* is not collocated with the LAN-GW 304-*f*, the AN 105-*g* may use the correlation ID to establish a link to the LAN-GW 304-*f* on behalf of the EPS-bearer associated with EPS-Bearer-ID.

The AN 105-*g* may send an RRC connection reconfiguration message 616 to the UE 115-*g* indicating acceptance of the LAN connectivity request message 602. The RRC connection reconfiguration message 616 may contain at least one parameter for specifying a configuration of data radio bearers (e.g., the MAC/EUI address which the UE 115-*g* may use to exchange data with the LAN 246-*g*, mapping to VLAN tags, an Ethernet frame type, an access point name, and the like). The UE 115-*g* may configure one or more DRBs based on the RRC connection reconfiguration message.

The signaling for RRC connection reconfiguration complete 618, bearer setup response 620, direct transfer 622, and LAN connectivity complete 624 in signaling flow 600 may be the same as or similar as the signaling for messages 518, 520, 522, and 524 of signaling flow 500 discussed above with reference to FIG. 5. After successful completion of signaling flow 600, the UE 115-*g* may send Ethernet packets destined to the LAN 246-*g* to the AN 105-*g* via one or more DRLs, as described above with reference to FIG. 5

In a variation of signaling flows 500 and 600, the UE 115-*g* may forward a MAC/EUI address to the LAN-GW 304-*f* in messages 502, 504, 506, and 508 in signaling flow 500 of FIG. 5, which the LAN-GW 304-*f* may replace with a new MAC/EUI address as shown in 610, 612, 614, and 616 in signaling flow 600 of FIG. 6. Additionally or alternatively, if, for example, the UE 115-*g* does not provide a MAC/EUI address in message 502 or 602, the MME of CN 130-*g* may hold a MAC/EUI address for UE 115-*g* and insert that address in the create session request in message 606 of signaling flow 600.

Additionally or alternatively, the UE 115-*g* may include an Ethernet frame type in the LAN connectivity request (see messages 502 and 602 described with reference to FIGS. 5 and 6) in addition to the PDN-type. The AN 105 may pass the Ethernet frame type on to the MME of CN 130 in the modified LAN connectivity request (see messages 504 and 604 described with reference to FIGS. 5 and 6), to the SGW in the create session request (see messages 506 and 606 described with reference to FIGS. 5 and 6), and to the LAN-GW 304 in the create session request (see session request messages 508 and 608 described with reference to FIGS. 5 and 6). The LAN-GW 304-*f* may implement a filter function using the Ethernet frame type and only forward Ethernet frames of the specified type toward the UE 115-*g*. In an example, the Ethernet frame type may be included into Protocol Configuration Options (PCO), for instance, which may be transparently carried from the UE 115-*g* to the LAN-GW 304-*f* (e.g., see messages 502, 504, 506, and 508 of signaling flow 500, see messages 602, 604, 606, and 608 of signaling flow 600).

The signaling described in signaling flow 500 and/or 600 may be completed multiple times to provide connectivity to multiple networks. The networks can be different LANs (see FIG. 3B) or may be a LAN and IP-based network (see FIGS. 3C and 3D). The IP-based networks may be local (see FIG. 3C, e.g., using a L-GW collocated with an AN), or global (see FIG. 3D, e.g. using a PGW).

When connecting to multiple LANs is supported, a UE 115 may have a separate physical address (e.g., MAC/EUI address) for each LAN. The UE 115 may use the same message signaling flow (e.g., signaling flow 500 or 600) for establishment of connectivity with each LAN. The UE 115 may establish connectivity to each LAN subsequently or in parallel. The UE 115 may flag which LAN it wishes to connect via an access point name value (APN-value) inserted into the LAN connectivity request of messages 502, 602 of either signaling flow 500 or 600. The AN 105 may forward the APN-value to the MME of CN 130 (e.g., in modified LAN connectivity request message 504 or 604 in either signaling flow 500 or 600). Subsequent to receipt, the MME of CN 130 may select a different EPS bearer for each LAN. Further, for each of the LANs, a MAC/EUI address may be allocated using either scheme discussed above in FIGS. 5 and 6.

If establishing simultaneous connectivity to a LAN and an IP network, a UE 115 may hold a MAC/EUI address for LAN-connectivity and an IP address for IP-network connectivity. The U-plane protocol stack for LAN-connectivity is shown in FIG. 4A, and the U-plane protocol stack for IP-connectivity may use IP instead of Ethernet (802.3) on top of the cellular RAT. The UE 115 may establish LAN connectivity as described above with reference to FIGS. 5 and 6, and may use a conventional IP-based PDN connectivity request for establishment of connectivity to an IP network.

The examples may also support VLAN-domains, such as for example, selective access to one or multiple VLAN domains. To do so, the examples provide mechanisms for physical address (e.g., MAC/EUI address) configuration that specify how VLAN-domain configurations and polices are communicated between a UE 115 and a LAN-GW 304.

In one example mechanism, the UE 115 is configured with one or a subset of VLAN IDs the UE 115 is permitted to use. The UE 115 may include the permitted VLAN IDs into PCOs and included in the LAN connectivity request (see LAN connectivity request message 502 of signaling flow 500). The PCO may be transparently passed on to the LAN-GW 304 in messages 502, 504, 506, and 508 of signaling flow 500. Based on the VLAN IDs forwarded by the UE 115, the LAN-GW 304 may implement filtering when bridging traffic from the LAN 246 to the UE 115.

In another example mechanism, the LAN-GW 304 may be configured with VLAN IDs that may be supported by the UE 115. The LAN-GW 304 may include these VLAN IDs into PCOs it passes on to the UE 115 in messages 610, 612, 614, 616 of signaling flow 600. The UE 115 may use the VLAN IDs for VLAN tagging traffic forwarded to the LAN 246.

In another example, the UE 115 may pass its configured VLAN ID policies to the LAN-GW 304 via PCOs and the LAN-GW 304 may subsequently overwrite the VLAN ID policies with its own PCOs. In this example, forwarding of VLAN ID policies may be independent of MAC/EUI configuration.

The examples may also use Priority Code Points (PCPs) to enforce LAN service priorities via on an Ethernet VLAN tag on the cellular link. To do so, LAN Service Priorities may be mapped to a cellular RAT via VLAN PCP. In an example, multiple EPS bearers using different quality of service (QoS) class identifiers (QCI) may be configured on the cellular data radio link for the same LAN 246. The UE 115-*g* and the LAN-GW 304 and/or AN 105-*g* may evaluate a VLAN PCP field on a VLAN tag of each Ethernet packet and forward it to one of the EPS bearers assigned to the value from the VLAN PCP field.

With reference to FIG. 5, the UE 115-*f* may forward supported VLAN-PCP values in the LAN connectivity request message 502 of signaling flow 500, and the supported VLAN-PCP values may be forwarded in messages 504, 506, and 508 to the LAN-GW 304-*e*. Based at least in part on the received VLAN-PCP values, the LAN-GW 304-*e* may decide how many additional dedicated EPS-bearers to establish. The LAN-GW 304-*e* may then create the corresponding EPS-Bearer-IDs and corresponding traffic-flow-templates (TFTs), and send this information back to the AN 105-*f* via SGW and MME of CN 130-*f* (see message 510, 512, 514 described with reference to FIG. 5). The LAN-GW 304-*e* may also select a correlation ID for each EPS bearer and send the set of correlation IDs to the AN 105-*f*. The AN 105-*f* may establish a DRB for each EPS bearer (see RRC connection reconfiguration message 516 described with reference to FIG. 5). The AN 105-*f* may inform the UE 115-*f* of the mapping between VLAN PCP value and an identifier of the DRB (DRB ID). Further, the AN 105-*f* and LAN-GW 304-*e* may create a separate DRB for each DRB Id. If AN 105-*f* and LAN-GW 304-*e* are not collocated, the correlation IDs and their mapping to EPS-Bearer-IDs may be used to create the separate DRB. The LAN-GW 304-*e* may then forward Ethernet packets to an appropriate one of the DRBs based on the VLAN PCP value carried by an Ethernet packet header.

The signaling flow 600 of FIG. 6 may provide a slightly different message sequence than signaling flow 500 when using PCPs for enforcing LAN service priorities on an Ethernet VLAN tag. In the example of FIG. 6, the LAN-GW 304-*f* may be configured with supported VLAN PCP values. Based on this configuration, the LAN-GW 304-*f* may proactively create dedicated EPS bearers and forward a mapping between the created EPS bearers, TFTs and VLAN PCP values to the AN 105-*g* in message 610, 612, 614 of signaling flow 600. The LAN-GW 304-*f* may also include a correlation ID for each EPS bearer. Message 612, 614, and 616 of signaling flow 600 for enforcing LAN service priorities via PCPs may be the same as the corresponding message shown described above in signaling flow 500.

The examples may also support a UE 115 exchanging multicast and broadcast traffic with the LAN 246. For example, native Ethernet support for multicast and broadcast traffic may be leveraged. Further, the bridging function of LAN-GW 304 may enable such traffic exchange in the following manner: (1) forward multicast or broadcast packets arriving at the LAN 246 to the UE 115; (2) forward multicast or broadcast packets arriving from the UE 115 to the LAN 246; and (3) forward multicast or broadcast packets arriving from one UE 115 to another UE.

The above examples have been discussed with reference to the architectures of FIGS. 3A-3D that have an MME, HSS, and SGW residing within CN 130, and the LAN-GW 304 being collocated with the AN 105-*g*. Variations to the disclosed architecture are possible. For example, the LAN-GW 304 may not be collocated with the AN 105, and the SGW, MME, and/or HSS may not be collocated with the CN 130.

The examples may also be implemented in other cellular network architectures (e.g., architectures that differentiate between a C-plane and a U-plane), such as, for example, SDN. In SDN, the C-plane may contain a controller function and the U-plane may contain one or more forwarding elements (FEs) that may be collocated with an AN 105. The examples may support LAN-based connectivity via a FE that executes LAN 802.1-bridging functions. IP-based connectivity may be supported in a parallel via an IP-based FE that executes an IP routing function.

FIG. 7 shows an example of a wireless communications system 700 having an SDN-based architecture for connecting to a LAN via a cellular RAT. Wireless communications systems 700 is an example of a wireless communications system 100 described with reference to FIG. 1. In some cases, wireless communications system 700 may represent aspects of techniques performed by a UE 115, base station 105, and CN 130 as described with reference to FIGS. 1-2. In the depicted example, AN 105-*h* may support simultaneous connectivity to an IP network 208-*b* and to a LAN 246-*h*. To provide such connectivity, the AN 105-*h* may include an SDN IP-based FE (SDN IP-FE) 702 and an SDN LAN-based FE (SDN LAN-FE) 704. In an example, connectivity to IP network 208-*b* may be established in accordance with section 5.3.2 and section 5.10.2 of 3GPP TS 23.401 v10.7.0 (2012 December), titled "Technical Specification Group Services and System Aspects; General Packet Radio Service (GPRS) enhancements for Evolved Universal Terrestrial Radio Access Network (E-UTRAN) access (Release 10)," the entire content of which is incorporated herein by reference. An SDN controller 706 may be a network node that is part of a CN 130 and may interface with the SDN IP-FE 702, SDN LAN-FE 704, and AN 105-*h*.

FIG. 8 illustrates an example signaling flow for establishment of LAN-connectivity using the SDN architecture of wireless communications system 700. In this example, the UE 115-*i* may already have a physical address configured. The SDN controller 706-*a* may be a central C-plane node that configures the SDN LAN-FE 704-*a* as well as an SDN IP-FE 702 (not shown in FIG. 8).

Signaling flow 800 may include the following signaling for establishment of LAN-connectivity. The signaling may be performed in other orders, some signaling may be combined, and a message described as being sent in a particular signal may be sent in multiple signals at the same or other times.

The UE 115-*i* may establish a signaling radio link with AN 105-*i*. Once established, the UE 115-*i* may send a LAN connectivity request message 802 (e.g., LAN connectivity request message) to the AN 105-*i*. The LAN connectivity request message 802 may specify "Ethernet" as PDN-type and include the physical address (e.g., MAC/EUI address) of UE 115-*i*. If establishing connectivity to an IP-based network instead of LAN 246-*i*, the connectivity request message may specify "IP" as the PDN-type. The LAN connectivity request may further include the Ethernet frame type and configured VLAN tags. The VLAN tag configuration may support separate network domains via VLAN ID values or service differentiation via VLAN-PCP values, as described above.

The AN 105-*i* may insert a C-plane address of the SDN LAN-FE 704-*a* into the LAN connectivity request and forward the modified LAN connectivity request message 804 to a network node (e.g., SDN controller 706-*a*). Subsequent to receipt, the SDN controller 706-*a* may define data radio links to be established. It is noted that, as used herein, the terms data radio link and data radio bearer are interchangeable. The number of data radio links may depend on the number of VLAN-PCP-based service-differentiators or VLAN ID-based subdomains configured on the UE 115-*i*. The SDN controller 706-*a* may further select a correlation ID for each defined data radio link.

The SDN controller 706-*a* may send a LAN-FE configuration message 806 to the SDN LAN-FE 704-*a* that includes one or more configuration parameters (e.g., the MAC/EUI address of UE 115-*i*, Ethernet frame type, one or more VLAN tags, one or more correlation IDs, and the like). The SDN LAN-FE 704-*a* may implement one or more configuration parameters contained in the request. For example, the SDN LAN-FE 704-*a* may use the MAC/EUI address to configure a bridging entry of a forwarding information base (FIB) for the UE 115-*i*. The configuration message may also include filter attributes, including, for example, Ethernet frame type and one or more VLAN tag values, for filtering of received packets. The configuration message may include one or more correlation IDs and their mapping to VLAN tags. If, for example, the SDN LAN-FE 704-*a* and AN 105-*i* are not collocated, the SDN LAN-FE 704-*a* and AN 105-*i* may interconnect established data radio links to FIB bridging entries for particular VLAN tags.

The SDN LAN-FE 704-*a* may acknowledge the configurations sent by the SDN controller 706-*a* in LAN-FE configuration message 806. For example, the SDN LAN-FE 704-*a* may send a LAN-FE configuration acknowledgement (ACK) message 808 to the SDN controller 706-*a*.

The SDN controller 706-*a* may send a data radio link setup request message 810 to the AN 105-*i* containing a LAN connectivity accept container. The data radio link setup request message 810 may include one or more data radio link identifiers (IDs), and information for the AN 105-*i* to establish one or more data radio links with the UE 115-*i*. The data radio link setup request message may further contain the mapping between the one or more DRL-IDs, the one or more correlation IDs, and the one or more VLAN tags.

The AN 105-*i* may send a radio connection reconfiguration message 812 to the UE 115-*i* indicating acceptance of the LAN connectivity request sent in the LAN connectivity request message 802. The radio connection reconfiguration message 812 may contain at least one parameter for specifying a configuration of one or more data radio bearers (e.g., the MAC/EUI address which the UE 115-*i* may use to exchange data with the LAN 246-*i*, mapping to VLAN tags, mapping between a DRL-ID and one or more VLAN tags and the like). The UE 115-*i* may configure one or more DRBs based on the radio connection reconfiguration message 812.

The UE 115-*i* may transmit a radio connection reconfiguration complete message 814 to the AN 105-*i* confirming that the one or more data radio links have been successfully configured. The AN 105-*i* may send a data radio link setup response message 816 to the SDN Controller 706-*a*. The AN 105-*i* and SDN LAN-FE 704-*a* may use the correlation ID and its mapping to the DRL-ID to interconnect the DRLs with the FIB bridging entries the SDN LAN-FE 704-*a* has for the MAC/EUI address of the UE 115-*i*. The UE 115-*i* may send a direct transfer message 818 to the AN 105-*i* to signal completion of LAN-Connectivity.

The AN 105-*i* may forward the LAN connectivity complete message 820 to the SDN controller 706-*a* to complete establishment of a data flow for exchanging data link layer packets with the LAN 246-*i* via the DRL. The data flow may be associated with a physical address of the UE 115-*i* and a VLAN tag. The data flow may be, for example, a PDN connection.

After successful completion of signaling flow 800, the UE 115-*i* may send Ethernet packets destined to the LAN 246-*i* to the AN 105-*i* via one or more DRLs. Subsequent to receipt of packets from the UE 115-*i* via a DRL, the AN 105-*i* may forward the packets to the SDN LAN-FE 704-*a*, and the SDN LAN-FE 704-*a* may forward the packets to the LAN 246-*i*. In the other direction, the bridging function of the SDN LAN-FE 704-*a* receives Ethernet packets from the LAN 246-*i*. The bridging function forwards selected ones of those packets carrying the MAC/EUI of the UE 115-*i* as destination address to the AN 105-*i*. The AN 105-*i* forwards the selected packets to DRLs associated with the UE 115-*i*. The AN 105-*i* selects which of the DRLs to use based at least in part on the VLAN tags and their mapping to DRL-IDs as defined by the SDN controller 706-*a*.

The signaling flow 800 may be used to establish simultaneously connectivity to multiple LANs. To do so, the UE 115-*i* may have one MAC/EUI address configured for each LAN. In the example of FIG. 8, the UE 115-*i* may hold a considerable amount of configuration information (e.g., such as MAC/EUI address and the support of particular VLAN domains and PCP service classifiers). In other examples, a UE 115 may not hold such a large amount of configuration information. Instead, the SDN controller 706-*a* may define a configuration subsequent to reception of the modified LAN connectivity request message (see modified LAN connectivity request message 804 of signaling flow 800) and return the defined configuration to the UE 115-*i* via the AN 105-*i* in data radio link setup request message 810 and the radio connection reconfiguration message 812 of signaling flow 800.

The SDN Controller 706-*a* is shown as a single-function entity in FIG. 8, and alternatively or additionally may be implemented in a distributed manner. For example, the SDN Controller 706-*a* may include multiple nodes that are distributed over a RAN and a CN 130. One or more of the SDN controllers 706 may also be collocated with the AN 105-*i*. In additional or alternative examples, the SDN controller 706-*a* may be composed of multiple independent functions.

Figure 9:
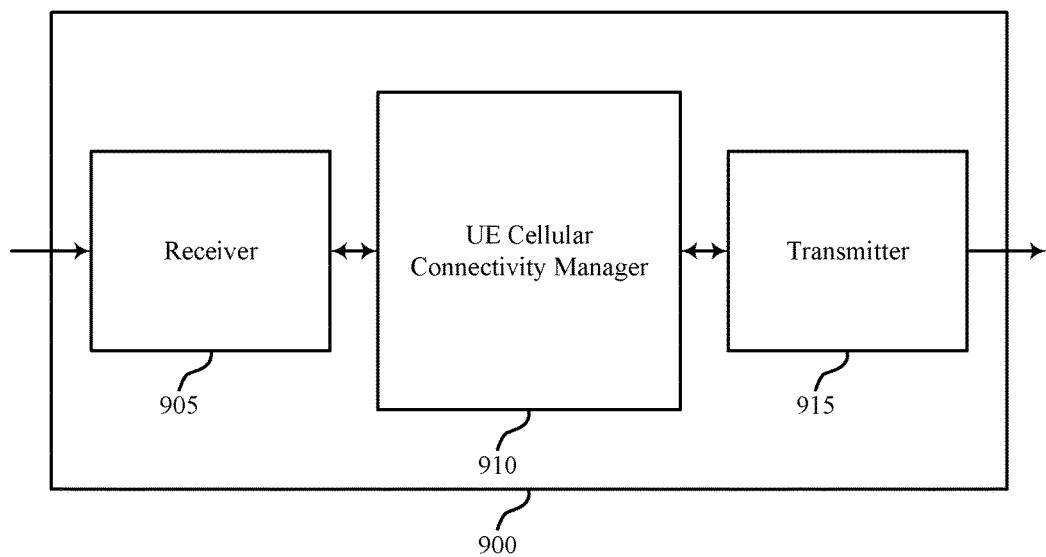
FIGS. 9 through 11 show block diagrams of a wireless device that supports connecting to a LAN via a cellular RAT in accordance with aspects of the present disclosure.

FIG. 9 shows a block diagram of a wireless device 900 that supports connecting to a LAN via a cellular RAT in accordance with various aspects of the present disclosure. Wireless device 900 may be an example of aspects of a UE 115 described with reference to FIGS. 1 and 2. Wireless device 900 may include receiver 905, UE cellular connectivity manager 910, and transmitter 915. Wireless device 900 may also include a processor. Each of these components may be in communication with each other.

The receiver 905 may receive information such as packets, user data, or control information associated with various information channels (e.g., control channels, data channels, and information related to connecting to a LAN via a cellular RAT, etc.). Information may be passed on to other components of the device. The receiver 905 may be an example of aspects of the transceiver 1225 described with reference to FIG. 12.

The UE cellular connectivity manager 910 may establish a signaling radio link with a cellular AN via a cellular RAT, transmit, to a network node via the signaling radio link, a connectivity request including a connectivity type for establishing connectivity to a LAN, establish a data radio link with the cellular AN based on an acceptance of the connectivity request, where the acceptance of the connectivity request includes at least one parameter for configuring the connectivity to the LAN, and establish a data flow for exchanging data link layer packets with the LAN via the data radio link. The UE cellular connectivity manager 910 may also be an example of aspects of the UE cellular connectivity manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
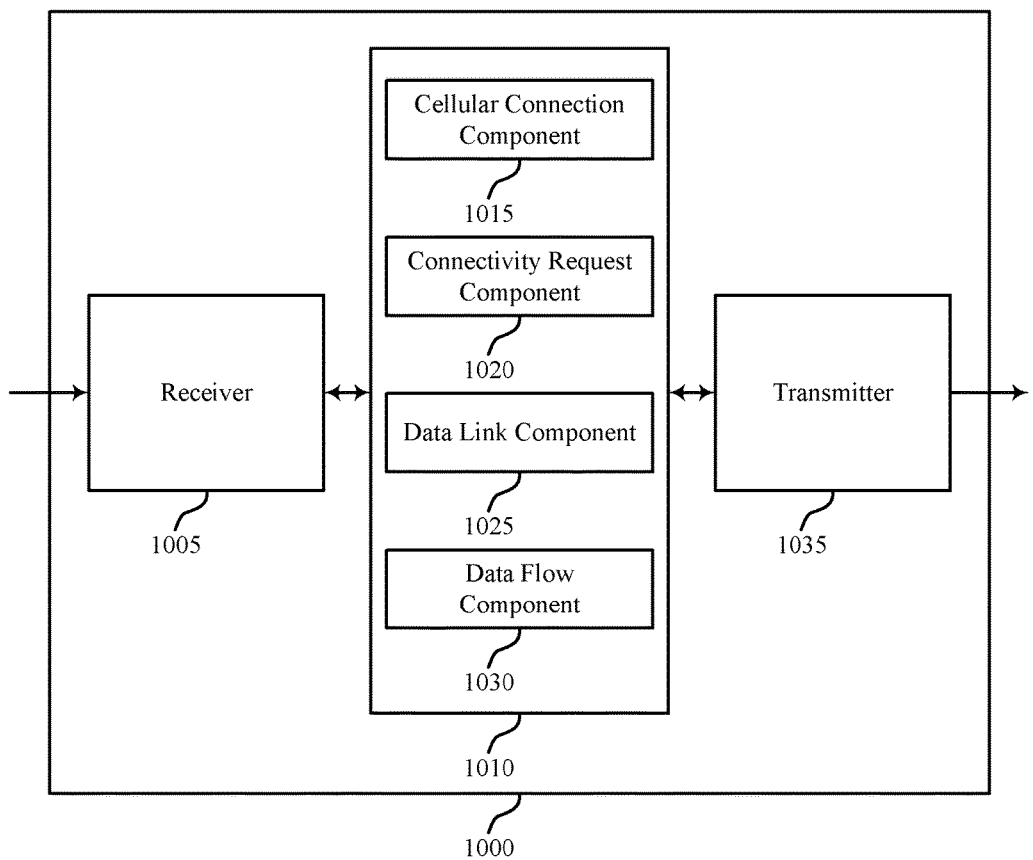

FIG. 10 shows a block diagram of a wireless device 1000 that supports connecting to a LAN via a cellular RAT in accordance with various aspects of the present disclosure. Wireless device 1000 may be an example of aspects of a wireless device 900 or a UE 115 described with reference to FIGS. 1, 2 and 9. Wireless device 1000 may include receiver 1005, UE cellular connectivity manager 1010 and transmitter 1035. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The UE cellular connectivity manager 1010 may be an example of aspects of UE cellular connectivity manager 910 described with reference to FIG. 9. The UE cellular connectivity manager 1010 may include cellular connection component 1015, connectivity request component 1020, data link component 1025 and data flow component 1030. The UE cellular connectivity manager 1010 may be an example of aspects of the UE cellular connectivity manager 1205 described with reference to FIG. 12.

The cellular connection component 1015 may establish a signaling radio link with a cellular AN via a cellular RAT. The connectivity request component 1020 may transmit a second connectivity request including a second connectivity type for establishing connectivity to one of the LAN and a second LAN, transmit a second connectivity request including an IP PDN type, and transmit, to a network node via the signaling radio link, a connectivity request including a connectivity type for establishing connectivity to a LAN. In some cases, the connectivity request includes the at least one parameter.

The data link component 1025 may establish a second data radio link with the cellular AN based on an acceptance of the second connectivity request. The data link component 1025 may establish a second data radio link with the cellular AN based on an acceptance of the second connectivity request. In some examples, a the second data flow is associated with the second data radio link. The data link component 1025 may also establish a data radio link with the cellular AN based on an acceptance of the connectivity request, where the acceptance of the connectivity request includes at least one parameter for configuring the connectivity to the LAN.

The data flow component 1030 may establish a second data flow for exchanging second data link layer packets with the LAN or the second LAN via the second data radio link, establish a second data flow for exchanging second data link layer packets with an IP network via the second data radio link, establish a second data flow based on the connectivity request, where the second data flow is associated with a physical address of the UE and a second VLAN tag, and establish a data flow for exchanging data link layer packets with the LAN via the data radio link. In some cases, the second data flow is associated with an IP address of the UE. In some cases, the data flow is associated with a VLAN tag.

The transmitter 1035 may transmit signals received from other components of wireless device 1000. In some examples, the transmitter 1035 may be collocated with a receiver in a transceiver module. For example, the transmitter 1035 may be an example of aspects of the transceiver 1225 described with reference to FIG. 12. The transmitter 1035 may utilize a single antenna, or it may utilize a plurality of antennas.

Figure 11:
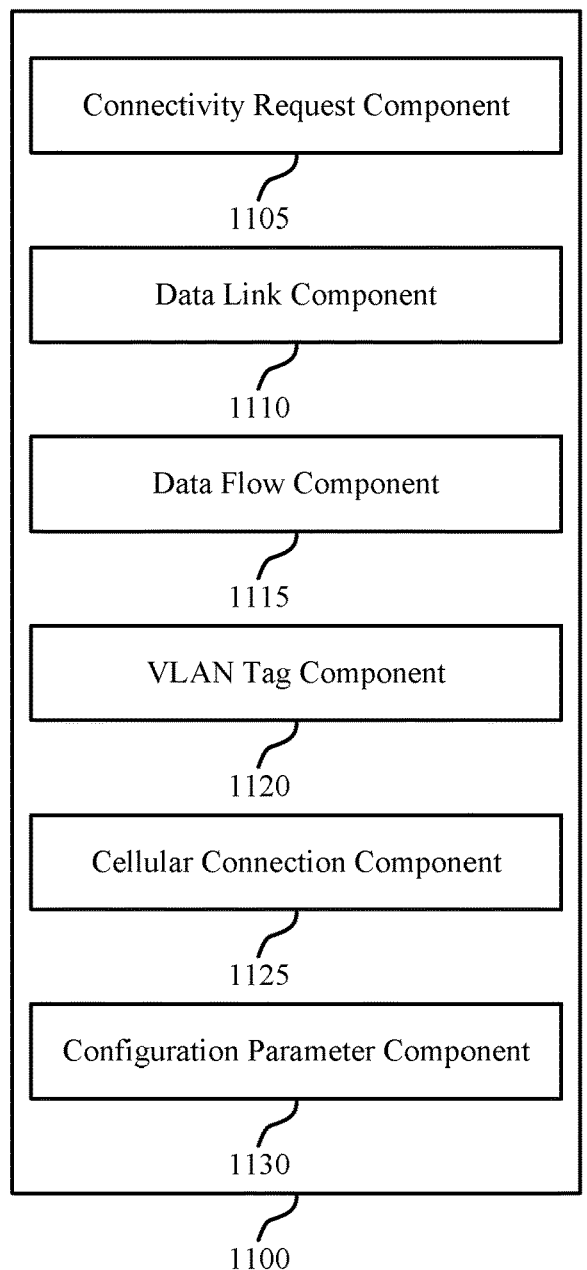

FIG. 11 shows a block diagram of a UE cellular connectivity manager 1100 which may be an example of the corresponding component of wireless device 900 or wireless device 1000. That is, UE cellular connectivity manager 1100 may be an example of aspects of UE cellular connectivity manager 910 or UE cellular connectivity manager 1010 described with reference to FIGS. 9 and 10. The UE cellular connectivity manager 1100 may also be an example of aspects of the UE cellular connectivity manager 1205 described with reference to FIG. 12.

The UE cellular connectivity manager 1100 may include connectivity request component 1105, data link component 1110, data flow component 1115, VLAN tag component 1120, cellular connection component 1125 and configuration parameter component 1130. Each of these modules may communicate, directly or indirectly, with one another (e.g., via one or more buses).

The connectivity request component 1105 may transmit a second connectivity request including a second connectivity type for establishing connectivity to one of the LAN and a second LAN, transmit a second connectivity request including an IP PDN type, and transmit, to a network node via the signaling radio link, a connectivity request including a connectivity type for establishing connectivity to a LAN. In some cases, the connectivity request includes the at least one parameter.

The data link component 1110 may establish a second data radio link with the cellular AN based on an acceptance of the second connectivity request. The data link component 1110 may establish a second data radio link with the cellular AN based on an acceptance of the second connectivity request. In some examples, a second data flow is associated with the second data radio link. The data link component 1110 may establish a data radio link with the cellular AN based on an acceptance of the connectivity request, where the acceptance of the connectivity request includes at least one parameter for configuring the connectivity to the LAN.

The data flow component 1115 may establish a second data flow for exchanging second data link layer packets with the LAN or the second LAN via the second data radio link, establish a second data flow for exchanging second data link layer packets with an IP network via the second data radio link, and establish a second data flow based on the connectivity request, where the second data flow is associated with a physical address of the UE and a second VLAN tag, and establish a data flow for exchanging data link layer packets with the LAN via the data radio link.

The VLAN tag component 1120 may transmit the first VLAN tag and the second VLAN tag to the network node. The cellular connection component 1125 may establish a signaling radio link with a cellular AN via a cellular RAT. The configuration parameter component 1130 may transmit, to the network node via the signaling radio link, the at least one parameter, where the at least one parameters is from the group consisting of a physical address of the UE, an Ethernet frame type, and an access point name. In some cases, the acceptance of the connectivity request is based on the at least one parameter.

Figure 12:
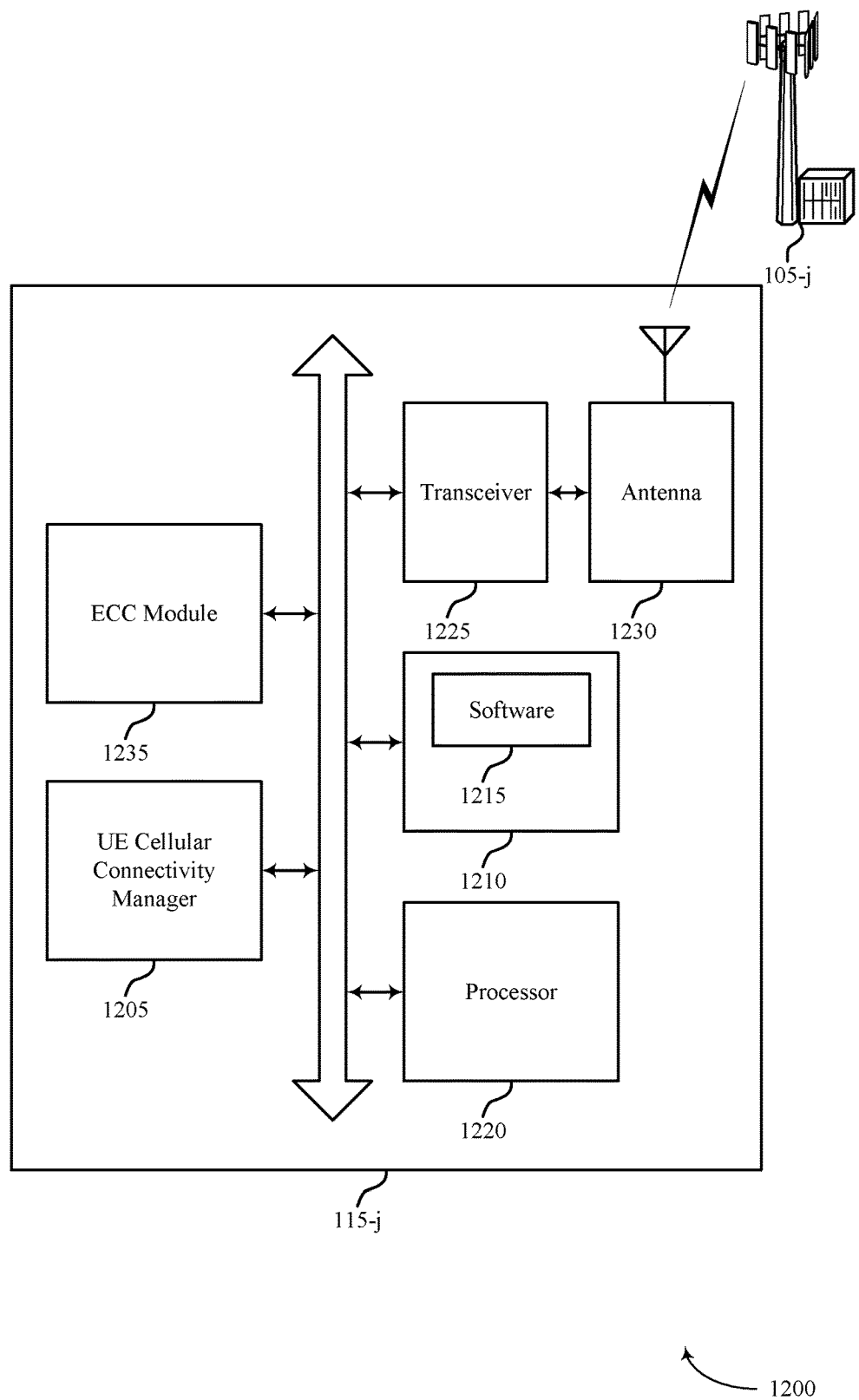
FIG. 12 illustrates a block diagram of a system including a UE that supports connecting to a LAN via a cellular RAT in accordance with aspects of the present disclosure.

FIG. 12 shows a diagram of a system 1200 including a device that supports connecting to a LAN via a cellular RAT in accordance with various aspects of the present disclosure. For example, system 1200 may include UE 115-j, which may be an example of a wireless device 900, a wireless device 1000, or a UE 115 as described with reference to FIGS. 1, 2 and 9 through 11.

UE 115-j may also include UE cellular connectivity manager 1205, memory 1210, processor 1220, transceiver 1225, antenna 1230, and ECC module 1235. Each of these modules may communicate, directly or indirectly, with one another (e.g., via one or more buses). The UE cellular connectivity manager 1205 may be an example of a UE cellular connectivity manager as described with reference to FIGS. 9 through 11.

The memory 1210 may include random access memory (RAM) and read only memory (ROM). The memory 1210 may store computer-readable, computer-executable software including instructions that, when executed, cause the processor to perform various functions described herein (e.g., connecting to a LAN via a cellular RAT, etc.). In some cases, the software 1215 may not be directly executable by the processor but may cause a computer (e.g., when compiled and executed) to perform functions described herein. The processor 1220 may include an intelligent hardware device, (e.g., a central processing unit (CPU), a microcontroller, an application specific integrated circuit (ASIC), etc.).

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions. ECC module 1235 may enable operations using enhanced component carriers, such as communication using shared or unlicensed spectrum, using reduced TTIs or subframe durations, or using a large number of component carriers.

Figure 13:
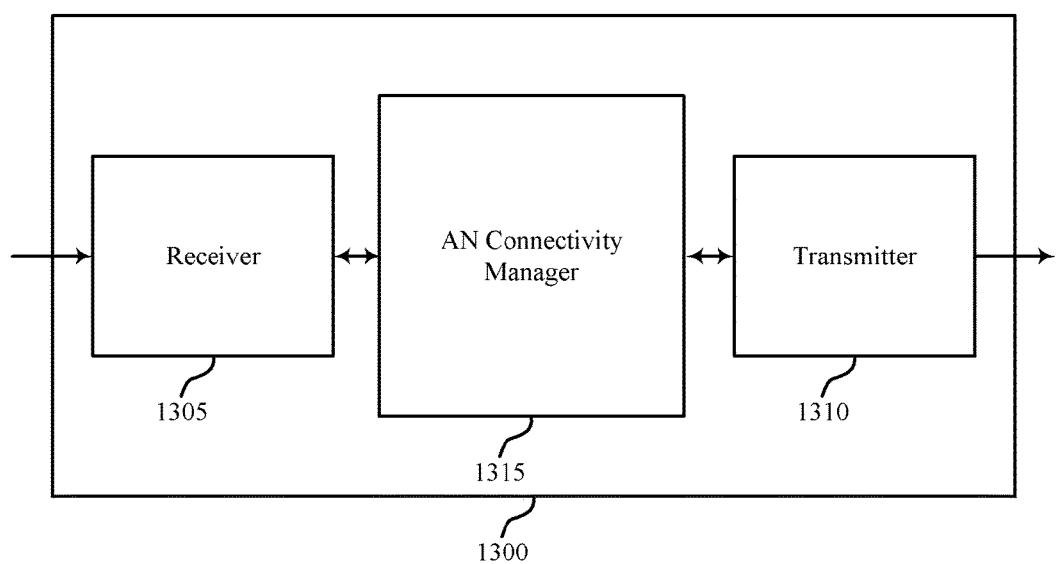
FIGS. 13 through 15 show block diagrams of a wireless device that supports connecting to a LAN via a cellular RAT in accordance with aspects of the present disclosure.

FIG. 13 shows a block diagram of a wireless device 1300 that supports connecting to a LAN via a cellular RAT in accordance with various aspects of the present disclosure. Wireless device 1300 may be an example of aspects of a base station 105 described with reference to FIGS. 1 and 2. Wireless device 1300 may include receiver 1305, transmitter 1310, and AN connectivity manager 1315. Wireless device 1300 may also include a processor. Each of these components may be in communication with each other.

The receiver 1305 may receive information such as packets, user data, or control information associated with various information channels (e.g., control channels, data channels, and information related to connecting to a LAN via a cellular RAT, etc.). Information may be passed on to other components of the device. The receiver 1305 may be an example of aspects of the transceiver 1625 described with reference to FIG. 16.

The transmitter 1310 may transmit signals received from other components of wireless device 1300. In some examples, the transmitter 1310 may be collocated with a receiver in a transceiver module. For example, the transmitter 1310 may be an example of aspects of the transceiver 1625 described with reference to FIG. 16. The transmitter 1310 may include a single antenna, or it may include a plurality of antennas.

The AN connectivity manager 1315 may establish a signaling radio link with a UE via a cellular RAT, receive, via the signaling radio link, a connectivity request for establishing connectivity to a LAN, forward the connectivity request to a network node, establish a data radio link with the UE based on receiving an acceptance of the connectivity request from the network node, where the acceptance of the connectivity request includes at least one parameter for configuring the connectivity to the LAN, and forward data link layer packets of a data flow between the data radio link and a bridging function to the LAN. The AN connectivity manager 1315 may also be an example of aspects of the AN connectivity manager 1605 described with reference to FIG. 16.

Figure 14:
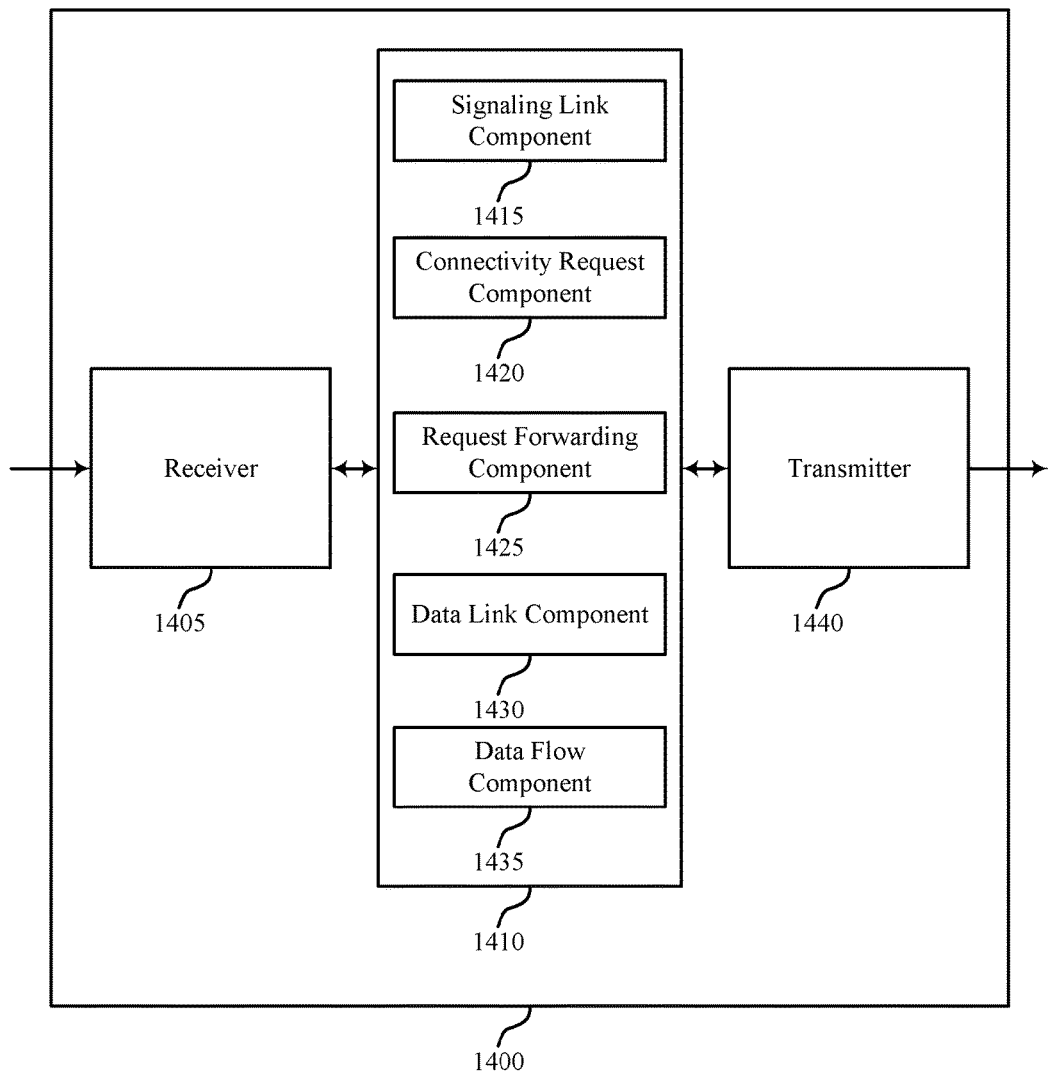

FIG. 14 shows a block diagram of a wireless device 1400 that supports connecting to a LAN via a cellular RAT in accordance with various aspects of the present disclosure. Wireless device 1400 may be an example of aspects of a wireless device 1300 or a base station 105 described with reference to FIGS. 1, 2, and 13. Wireless device 1400 may include receiver 1405, AN connectivity manager 1410 and transmitter 1440. Wireless device 1400 may also include a processor. Each of these components may be in communication with each other.

The receiver 1405 may receive information which may be passed on to other components of the device. The receiver 1405 may also perform the functions described with reference to the receiver 1305 of FIG. 13. The receiver 1405 may be an example of aspects of the transceiver 1625 described with reference to FIG. 16.

The AN connectivity manager 1410 may be an example of aspects of AN connectivity manager 1315 described with reference to FIG. 13. The AN connectivity manager 1410 may include signaling link component 1415, connectivity request component 1420, request forwarding component 1425, data link component 1430, and data flow component 1435. The AN connectivity manager 1410 may be an example of aspects of the AN connectivity manager 1605 described with reference to FIG. 16.

The signaling link component 1415 may establish a signaling radio link with a UE via a cellular RAT. The connectivity request component 1420 may receive, via the signaling radio link, a connectivity request for establishing connectivity to a LAN, and receive a second connectivity request for establishing PDN-connectivity.

The request forwarding component 1425 may forward the connectivity request to a network node, receive and forward a second connectivity request to the network node, and forward the second connectivity request to the network node. The data link component 1430 may establish a data radio link with the UE based on receiving an acceptance of the connectivity request from the network node, where the acceptance of the connectivity request includes at least one parameter for configuring the connectivity to the LAN, establish a second data radio link, establish a second data radio link based on receiving an acceptance of the second connectivity request from the network node, and establish a second data radio link based on receiving an acceptance of the second connectivity request from the network node.

The data flow component 1435 may forward data link layer packets of a data flow between the data radio link and a bridging function to the LAN, forward the second data link layer packets of a second data flow between the second data radio link and a second bridging function to the LAN, forward second data link layer packets of a second data flow between the second data radio link and a second bridging function, and forward second data link layer packets of a second data flow between the second data radio link and a routing function.

The transmitter 1440 may transmit signals received from other components of wireless device 1400. In some examples, the transmitter 1440 may be collocated with a receiver in a transceiver module. For example, the transmitter 1440 may be an example of aspects of the transceiver 1625 described with reference to FIG. 16. The transmitter 1440 may utilize a single antenna, or it may utilize a plurality of antennas.

Figure 15:
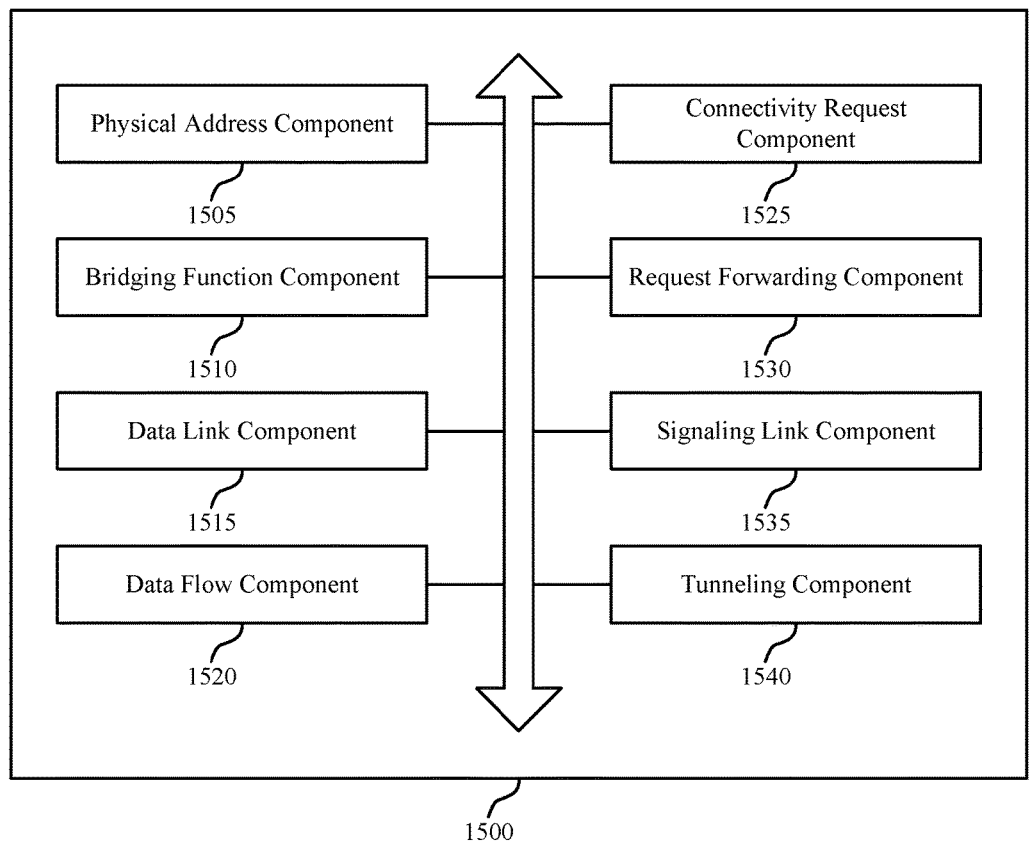

FIG. 15 shows a block diagram of an AN connectivity manager 1500 which may be an example of the corresponding component of wireless device 1300 or wireless device 1400. That is, AN connectivity manager 1500 may be an example of aspects of AN connectivity manager 1315 or AN connectivity manager 1410 described with reference to FIGS. 13 and 14. The AN connectivity manager 1500 may also be an example of aspects of the AN connectivity manager 1605 described with reference to FIG. 16.

The AN connectivity manager 1500 may include physical address component 1505, bridging function component 1510, data link component 1515, data flow component 1520, connectivity request component 1525, request forwarding component 1530, signaling link component 1535, and tunneling component 1540. Each of these modules may communicate, directly or indirectly, with one another (e.g., via one or more buses).

The physical address component 1505 may transmit, to the network node, a physical address of the UE. The physical address component 1505 may also transmit, to the network node, a second physical address of the UE associated with the second data flow. The physical address component 1505 may configure the second bridging function with the second physical address.

The bridging function component 1510 may configure the bridging function for communicating, to the LAN, data link layer packets that include the physical address, configure the bridging function for communicating, to the LAN, data link layer packets that include the physical address and a first VLAN tag, and configure the second bridging function for communicating second data link layer packets that include the physical address and a second VLAN tag.

The data link component 1515 may establish a data radio link with the UE based on receiving an acceptance of the connectivity request from the network node, where the acceptance of the connectivity request includes at least one parameter for configuring the connectivity to the LAN, establish a second data radio link, establish a second data radio link based on receiving an acceptance of the second connectivity request from the network node, and establish a second data radio link based on receiving an acceptance of the second connectivity request from the network node.

The data flow component 1520 may forward data link layer packets of a data flow between the data radio link and a bridging function to the LAN, forward the second data link layer packets of a second data flow between the second data radio link and a second bridging function to the LAN, forward second data link layer packets of a second data flow between the second data radio link and a second bridging function, and forward second data link layer packets of a second data flow between the second data radio link and a routing function.

The connectivity request component 1525 may receive, via the signaling radio link, a connectivity request for establishing connectivity to a LAN, and receive a second connectivity request for establishing PDN-connectivity. The request forwarding component 1530 may forward the connectivity request to a network node, receive and forward a second connectivity request to the network node, and forward the second connectivity request to the network node.

The signaling link component 1535 may establish a signaling radio link with a UE via a cellular RAT. The tunneling component 1540 may transmit, to the network node, a tunnel end-point address, establish a tunnel using the tunnel end-point address for communicating the data link layer packets of the data flow, transmit, to the network node, a tunnel end-point address, and establish a tunnel using the tunnel end-point address to forward the second data link layer packets of the second data flow.

Figure 16:
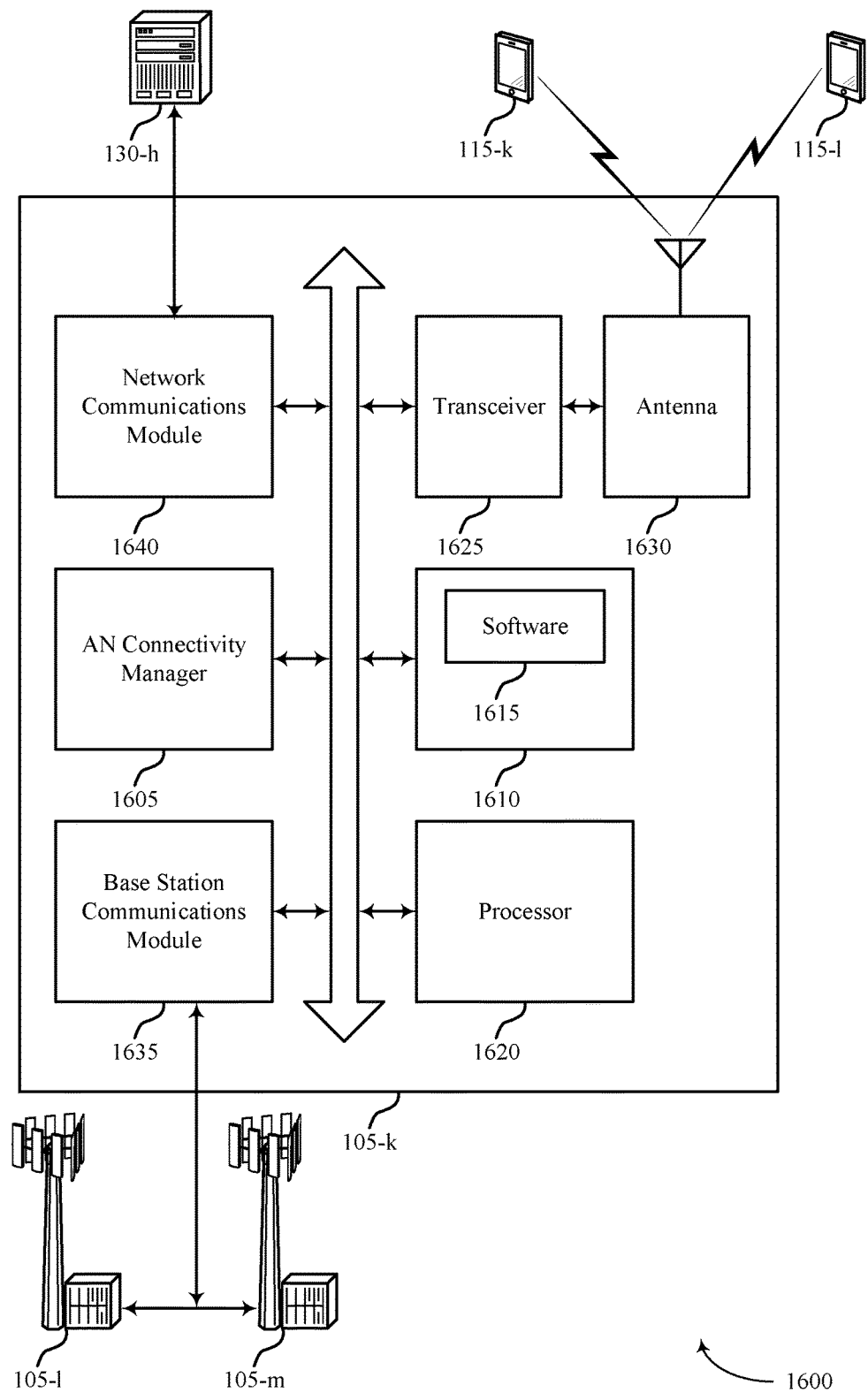
FIG. 16 illustrates a block diagram of a system including a base station that supports connecting to a LAN via a cellular RAT in accordance with aspects of the present disclosure.

FIG. 16 shows a diagram of a wireless communications system 1600 including a device configured that supports connecting to a LAN via a cellular RAT in accordance with various aspects of the present disclosure. For example, wireless communications system 1600 may include base station 105-k, which may be an example of a wireless device 1300, a wireless device 1400, or a base station 105 as described with reference to FIGS. 1, 2 and 13 through 15. Base station 105-k may also include components for bi-directional voice and data communications including components for transmitting communications and components for receiving communications. For example, base station 105-b may communicate bi-directionally with one or more UEs 115.

Base station 105-b may also include AN connectivity manager 1605, memory 1610, processor 1620, transceiver 1625, antenna 1630, base station communications module 1635, and network communications module 1640. Each of these modules may communicate, directly or indirectly, with one another (e.g., via one or more buses). The AN connectivity manager 1605 may be an example of an AN connectivity manager as described with reference to FIGS. 13 through 15.

The memory 1610 may include RAM and ROM. The memory 1610 may store computer-readable, computer-executable software including instructions that, when executed, cause the processor to perform various functions described herein (e.g., connecting to a LAN via a cellular RAT, etc.). In some cases, the software 1615 may not be directly executable by the processor but may cause a computer (e.g., when compiled and executed) to perform functions described herein. The processor 1620 may include an intelligent hardware device, (e.g., a CPU, a microcontroller, an ASIC, etc.).

The transceiver 1625 may communicate bi-directionally, via one or more antennas, wired, or wireless links, with one or more networks, as described above. For example, the transceiver 1625 may communicate bi-directionally with a base station 105 or a UE 115. The transceiver 1625 may also include a modem to modulate the packets and provide the modulated packets to the antennas for transmission, and to demodulate packets received from the antennas. In some cases, the wireless device may include a single antenna 1630. However, in some cases the device may have more than one antenna 1230, which may be capable of concurrently transmitting or receiving multiple wireless transmissions.

The base station communications module 1635 may manage communications with other base station 105, and may include a controller or scheduler for controlling communications with UEs 115 in cooperation with other base stations 105. For example, the base station communications module 1635 may coordinate scheduling for transmissions to UEs 115 for various interference mitigation techniques such as beamforming or joint transmission. In some examples, base station communications module 1635 may provide an X2 interface within an LTE/LTE-A wireless communication network technology to provide communication between base stations 105.

The network communications module 1640 may manage communications with the core network (e.g., via one or more wired backhaul links). For example, the network communications module 1640 may manage the transfer of data communications for client devices, such as one or more UEs 115.

Figure 17:
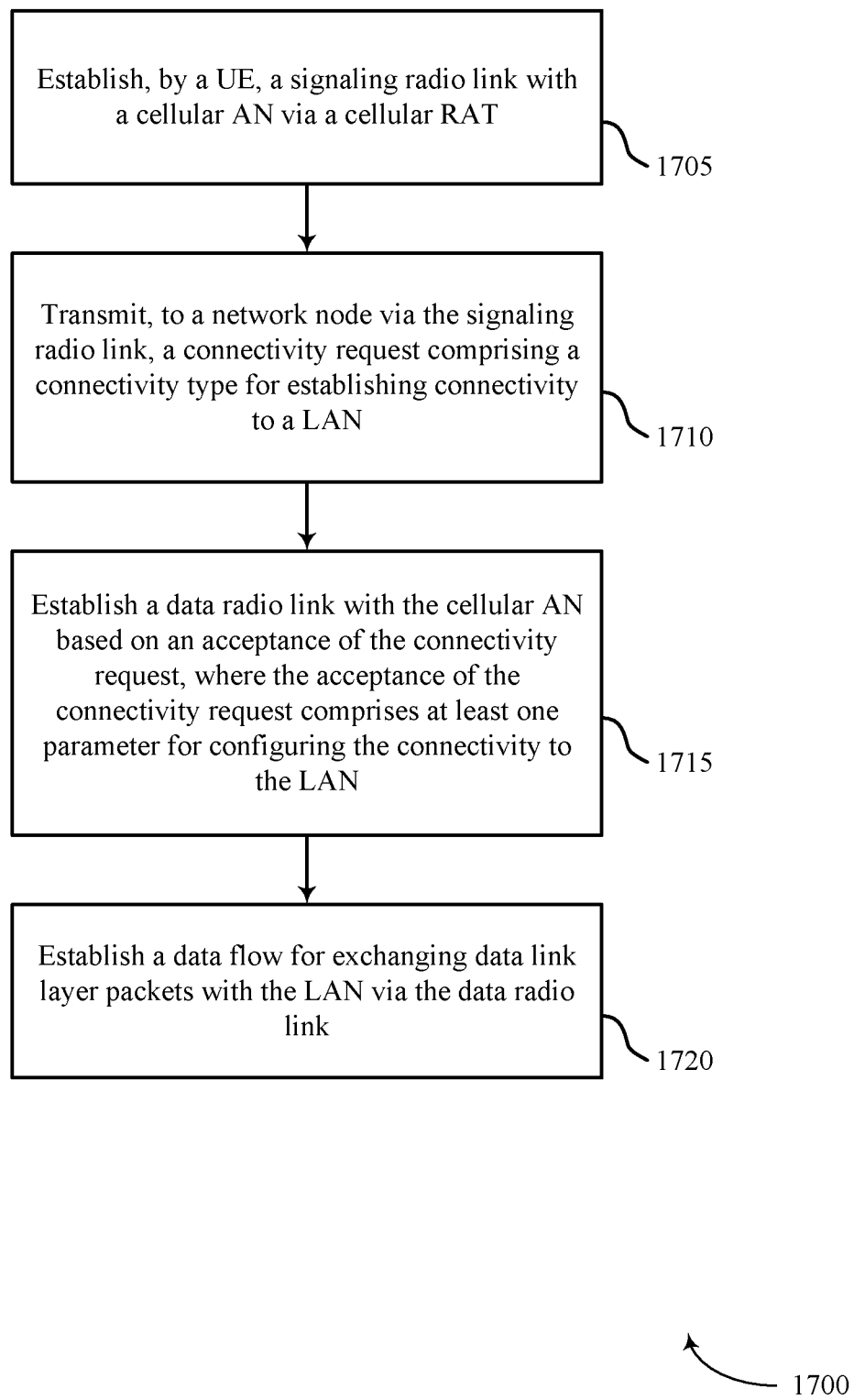
FIGS. 17 through 21 illustrate methods for connecting to a LAN via a cellular RAT in accordance with aspects of the present disclosure.

FIG. 17 shows a flowchart illustrating a method 1700 for connecting to a LAN via a cellular RAT in accordance with various aspects of the present disclosure. The operations of method 1700 may be implemented by a device such as a UE 115 or its components as described with reference to FIGS. 1 and 2. For example, the operations of method 1700 may be performed by the UE cellular connectivity manager as described herein. In some examples, the UE 115 may execute a set of codes to control the functional elements of the device to perform the functions described below. Additionally or alternatively, the UE 115 may perform aspects of the functions described below using special-purpose hardware.

At block 1705, the UE 115 may establish a signaling radio link with a cellular AN via a cellular RAT as described above with reference to FIGS. 2 through 8. In certain examples, the operations of block 1705 may be performed by the cellular connection component as described with reference to FIGS. 10 and 11.

At block 1710, the UE 115 may transmit, to a network node via the signaling radio link, a connectivity request including a connectivity type for establishing connectivity to a LAN as described above with reference to FIGS. 2 through 8. In certain examples, the operations of block 1710 may be performed by the connectivity request component as described with reference to FIGS. 10 and 11.

At block 1715, the UE 115 may establish a data radio link with the cellular AN based on an acceptance of the connectivity request, where the acceptance of the connectivity request includes at least one parameter for configuring the connectivity to the LAN as described above with reference to FIGS. 2 through 8. In certain examples, the operations of block 1715 may be performed by the data link component as described with reference to FIGS. 10 and 11.

At block 1720, the UE 115 may establish a data flow for exchanging data link layer packets with the LAN via the data radio link as described above with reference to FIGS. 2 through 8. In certain examples, the operations of block 1720 may be performed by the data flow component as described with reference to FIGS. 10 and 11.

Figure 18:
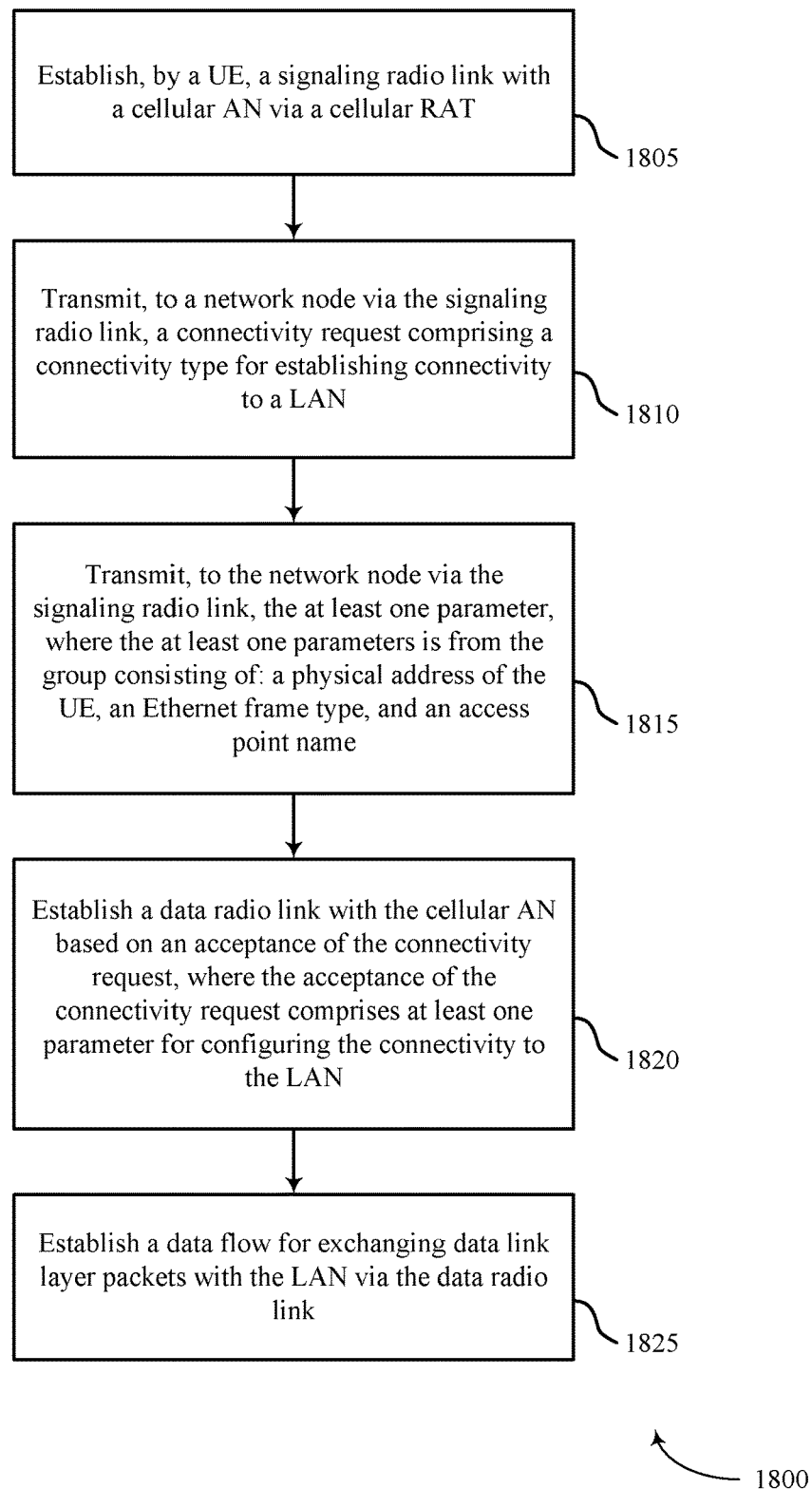

FIG. 18 shows a flowchart illustrating a method 1800 for connecting to a LAN via a cellular RAT in accordance with various aspects of the present disclosure. The operations of method 1800 may be implemented by a device such as a UE 115 or its components as described with reference to FIGS. 1 and 2. For example, the operations of method 1800 may be performed by the UE cellular connectivity manager as described herein. In some examples, the UE 115 may execute a set of codes to control the functional elements of the device to perform the functions described below. Additionally or alternatively, the UE 115 may perform aspects of the functions described below using special-purpose hardware.

At block 1805, the UE 115 may establish a signaling radio link with a cellular AN via a cellular RAT as described above with reference to FIGS. 2 through 8. In certain examples, the operations of block 1805 may be performed by the cellular connection component as described with reference to FIGS. 10 and 11.

At block 1810, the UE 115 may transmit, to a network node via the signaling radio link, a connectivity request including a connectivity type for establishing connectivity to a LAN as described above with reference to FIGS. 2 through 8. In certain examples, the operations of block 1810 may be performed by the connectivity request component as described with reference to FIGS. 10 and 11.

At block 1815, the UE 115 may transmit, to the network node via the signaling radio link, the at least one parameter, where the at least one parameters is from the group consisting of: a physical address of the UE, an Ethernet frame type, and an access point name as described above with reference to FIGS. 2 through 8. In certain examples, the operations of block 1815 may be performed by the configuration parameter component as described with reference to FIGS. 10 and 11.

At block 1820, the UE 115 may establish a data radio link with the cellular AN based on an acceptance of the connectivity request, where the acceptance of the connectivity request includes at least one parameter for configuring the connectivity to the LAN as described above with reference to FIGS. 2 through 8. In certain examples, the operations of block 1820 may be performed by the data link component as described with reference to FIGS. 10 and 11.

At block 1825, the UE 115 may establish a data flow for exchanging data link layer packets with the LAN via the data radio link as described above with reference to FIGS. 2 through 8. In certain examples, the operations of block 1825 may be performed by the data flow component as described with reference to FIGS. 10 and 11.

Figure 19:
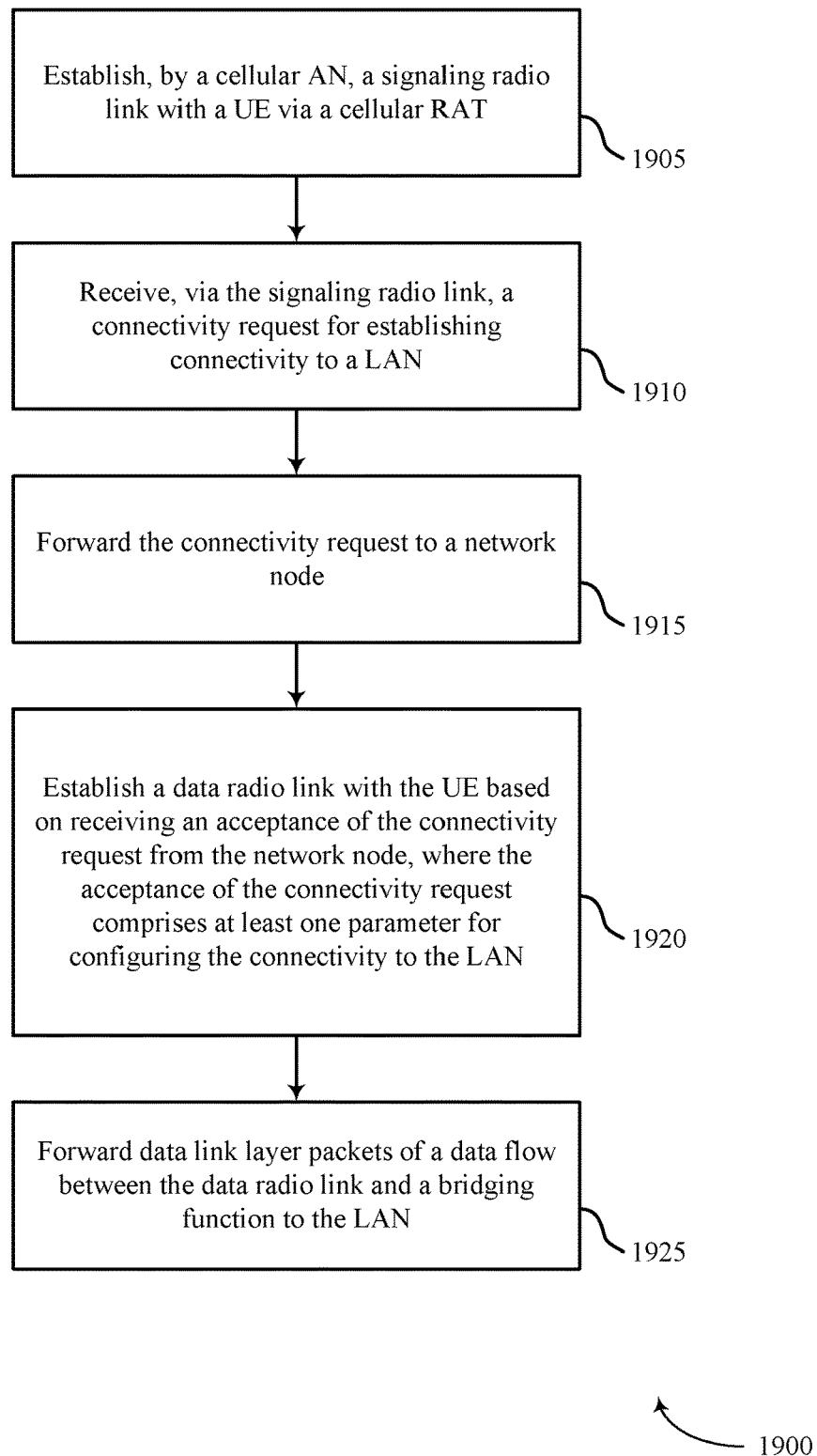

FIG. 19 shows a flowchart illustrating a method 1900 for connecting to a LAN via a cellular RAT in accordance with various aspects of the present disclosure. The operations of method 1900 may be implemented by a device such as a base station 105 or its components as described with reference to FIGS. 1 and 2. For example, the operations of method 1900 may be performed by the AN connectivity manager as described herein. In some examples, the base station 105 may execute a set of codes to control the functional elements of the device to perform the functions described below. Additionally or alternatively, the base station 105 may perform aspects of the functions described below using special-purpose hardware.

At block 1905, the base station 105 may establish a signaling radio link with a UE via a cellular RAT as described above with reference to FIGS. 2 through 8. In certain examples, the operations of block 1905 may be performed by the signaling link component as described with reference to FIGS. 14 and 15.

At block 1910, the base station 105 may receive, via the signaling radio link, a connectivity request for establishing connectivity to a LAN as described above with reference to FIGS. 2 through 8. In certain examples, the operations of block 1910 may be performed by the connectivity request component as described with reference to FIGS. 14 and 15.

At block 1915, the base station 105 may forward the connectivity request to a network node as described above with reference to FIGS. 2 through 8. In certain examples, the operations of block 1915 may be performed by the request forwarding component as described with reference to FIGS. 14 and 15.

At block 1920, the base station 105 may establish a data radio link with the UE based on receiving an acceptance of the connectivity request from the network node, where the acceptance of the connectivity request includes at least one parameter for configuring the connectivity to the LAN as described above with reference to FIGS. 2 through 8. In certain examples, the operations of block 1920 may be performed by the data link component as described with reference to FIGS. 14 and 15.

At block 1925, the base station 105 may forward data link layer packets of a data flow between the data radio link and a bridging function to the LAN as described above with reference to FIGS. 2 through 8. In certain examples, the operations of block 1925 may be performed by the data flow component as described with reference to FIGS. 14 and 15.

Figure 20:
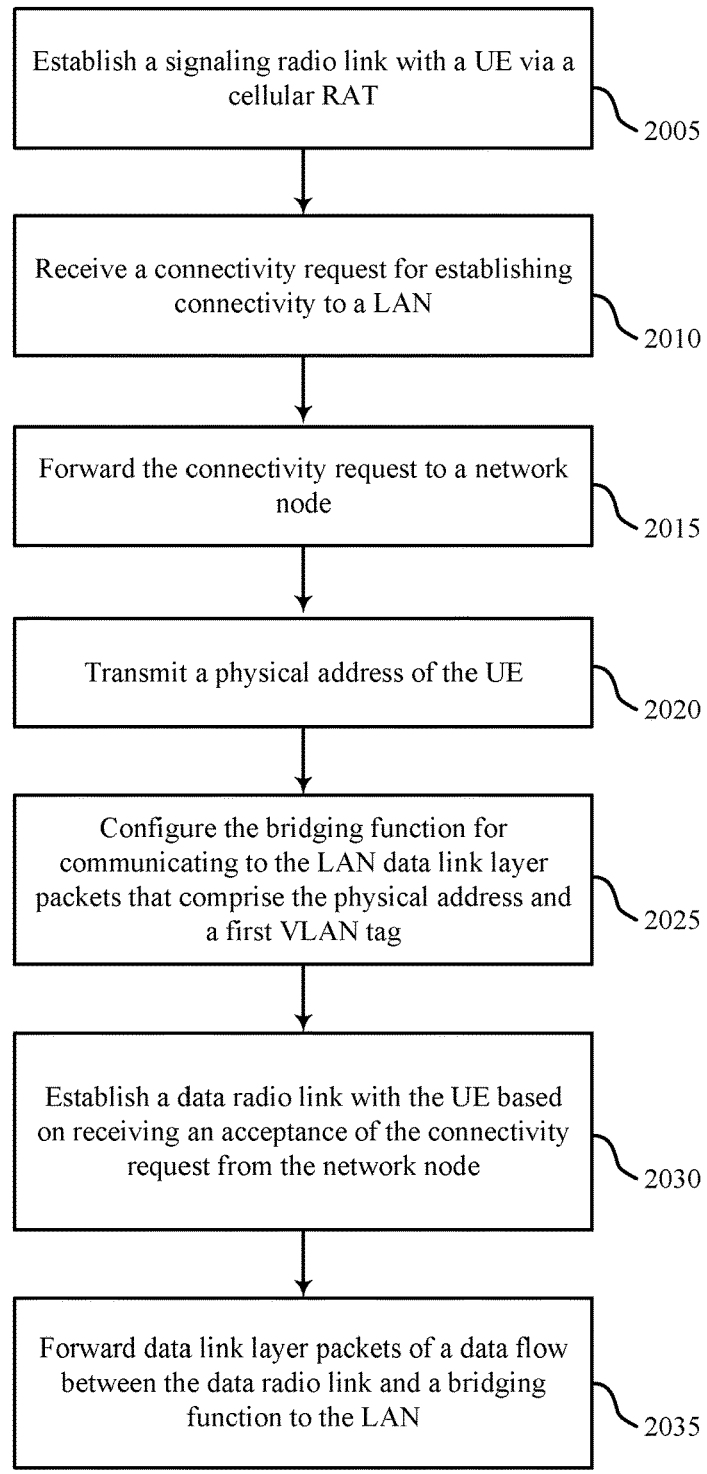

FIG. 20 shows a flowchart illustrating a method 2000 for connecting to a LAN via a cellular RAT in accordance with various aspects of the present disclosure. The operations of method 2000 may be implemented by a device such as a base station 105 or its components as described with reference to FIGS. 1 and 2. For example, the operations of method 2000 may be performed by the AN connectivity manager as described herein. In some examples, the base station 105 may execute a set of codes to control the functional elements of the device to perform the functions described below. Additionally or alternatively, the base station 105 may perform aspects of the functions described below using special-purpose hardware.

At block 2005, the base station 105 may establish a signaling radio link with a UE via a cellular RAT as described above with reference to FIGS. 2 through 8. In certain examples, the operations of block 2005 may be performed by the signaling link component as described with reference to FIGS. 14 and 15.

At block 2010, the base station 105 may receive, via the signaling radio link, a connectivity request for establishing connectivity to a LAN as described above with reference to FIGS. 2 through 8. In certain examples, the operations of block 2010 may be performed by the connectivity request component as described with reference to FIGS. 14 and 15.

At block 2015, the base station 105 may forward the connectivity request to a network node as described above with reference to FIGS. 2 through 8. In certain examples, the operations of block 2015 may be performed by the request forwarding component as described with reference to FIGS. 14 and 15.

At block 2020, the base station 105 may transmit, to the network node, a physical address of the UE as described above with reference to FIGS. 2 through 8. In certain examples, the operations of block 2020 may be performed by the physical address component as described with reference to FIGS. 14 and 15.

At block 2025, the base station 105 may configure the bridging function for communicating, to the LAN, data link layer packets that include the physical address and a first VLAN tag as described above with reference to FIGS. 2 through 8. In certain examples, the operations of block 2025 may be performed by the bridging function component as described with reference to FIGS. 14 and 15.

At block 2030, the base station 105 may establish a data radio link with the UE based on receiving an acceptance of the connectivity request from the network node, where the acceptance of the connectivity request includes at least one parameter for configuring the connectivity to the LAN as described above with reference to FIGS. 2 through 8. In certain examples, the operations of block 2030 may be performed by the data link component as described with reference to FIGS. 14 and 15.

At block 2035, the base station 105 may forward data link layer packets of a data flow between the data radio link and a bridging function to the LAN as described above with reference to FIGS. 2 through 8. In certain examples, the operations of block 2035 may be performed by the data flow component as described with reference to FIGS. 14 and 15.

Figure 21:
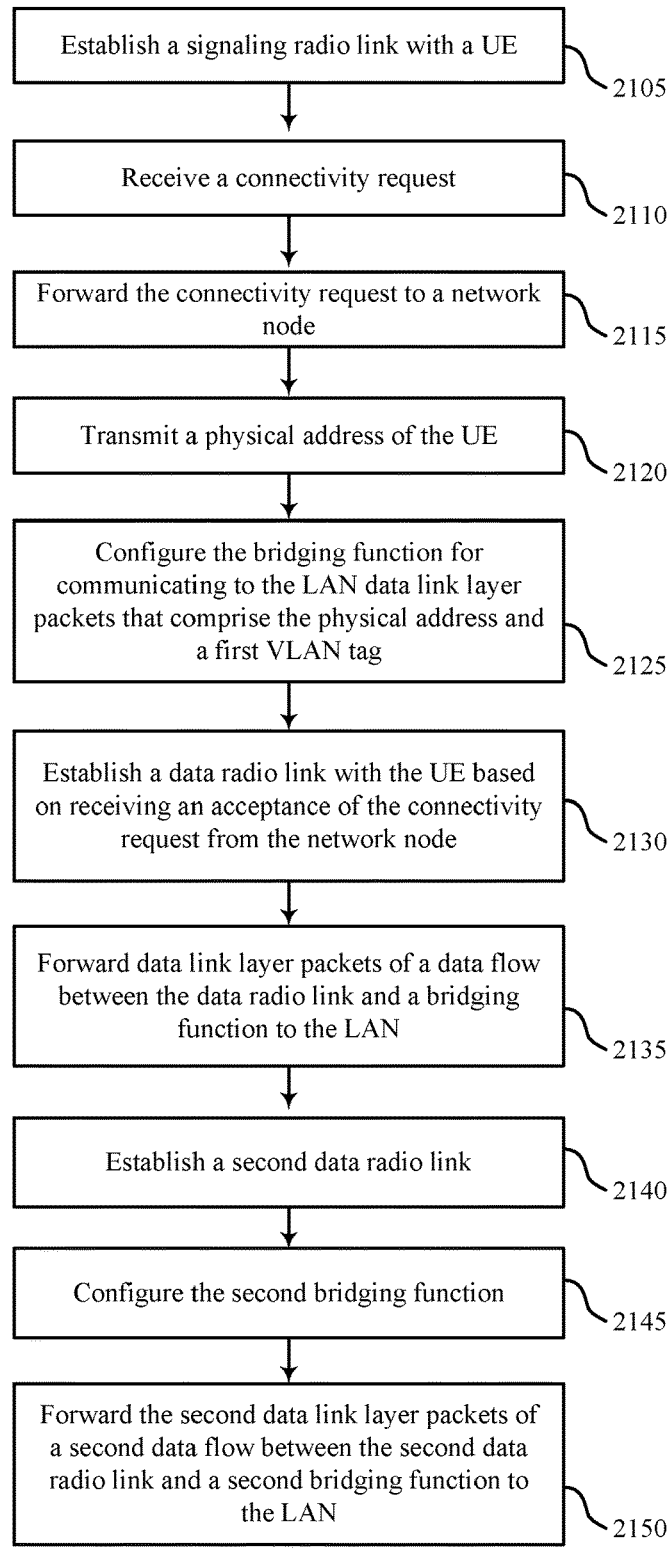

FIG. 21 shows a flowchart illustrating a method 2100 for connecting to a LAN via a cellular RAT in accordance with various aspects of the present disclosure. The operations of method 2100 may be implemented by a device such as a base station 105 or its components as described with reference to FIGS. 1 and 2. For example, the operations of method 2100 may be performed by the AN connectivity manager as described herein. In some examples, the base station 105 may execute a set of codes to control the functional elements of the device to perform the functions described below. Additionally or alternatively, the base station 105 may perform aspects of the functions described below using special-purpose hardware.

At block 2105, the base station 105 may establish a signaling radio link with a UE via a cellular RAT as described above with reference to FIGS. 2 through 8. In certain examples, the operations of block 2105 may be performed by the signaling link component as described with reference to FIGS. 14 and 15.

At block 2110, the base station 105 may receive, via the signaling radio link, a connectivity request for establishing connectivity to a LAN as described above with reference to FIGS. 2 through 8. In certain examples, the operations of block 2110 may be performed by the connectivity request component as described with reference to FIGS. 14 and 15.

At block 2115, the base station 105 may forward the connectivity request to a network node as described above with reference to FIGS. 2 through 8. In certain examples, the operations of block 2115 may be performed by the request forwarding component as described with reference to FIGS. 14 and 15.

At block 2120, the base station 105 may transmit, to the network node, a physical address of the UE as described above with reference to FIGS. 2 through 8. In certain examples, the operations of block 2120 may be performed by the physical address component as described with reference to FIGS. 14 and 15.

At block 2125, the base station 105 may configure the bridging function for communicating, to the LAN, data link layer packets that include the physical address and a first VLAN tag as described above with reference to FIGS. 2 through 8. In certain examples, the operations of block 2125 may be performed by the bridging function component as described with reference to FIGS. 14 and 15.

At block 2130, the base station 105 may establish a data radio link with the UE based on receiving an acceptance of the connectivity request from the network node, where the acceptance of the connectivity request includes at least one parameter for configuring the connectivity to the LAN as described above with reference to FIGS. 2 through 8. In certain examples, the operations of block 2130 may be performed by the data link component as described with reference to FIGS. 14 and 15.

At block 2135, the base station 105 may forward data link layer packets of a data flow between the data radio link and a bridging function to the LAN as described above with reference to FIGS. 2 through 8. In certain examples, the operations of block 2135 may be performed by the data flow component as described with reference to FIGS. 14 and 15.

At block 2140, the base station 105 may establish a second data radio link as described above with reference to FIGS. 2 through 8. In certain examples, the operations of block 2140 may be performed by the data link component as described with reference to FIGS. 14 and 15.

At block 2145, the base station 105 may configure the second bridging function for communicating second data link layer packets that include the physical address and a second VLAN tag as described above with reference to FIGS. 2 through 8. In certain examples, the operations of block 2145 may be performed by the bridging function component as described with reference to FIGS. 14 and 15.

At block 2150, the base station 105 may forward the second data link layer packets of a second data flow between the second data radio link and a second bridging function to the LAN as described above with reference to FIGS. 2 through 8. In certain examples, the operations of block 2150 may be performed by the data flow component as described with reference to FIGS. 14 and 15.

It should be noted that the methods 1700, 1800, 1900, 2000, and 2100 are just example implementation, and that the operations of the methods 1700, 1800, 1900, 2000, and 2100 may be rearranged or otherwise modified such that other implementations are possible. In some examples, aspects from two or more of the methods 1700, 1800, 1900, 2000, and 2100 described with reference to FIGS. 17, 18, 19, 20, and 21 may be combined. For example, aspects of each of the methods may include steps or aspects of the other methods, or other steps or techniques described herein. Thus, aspects of the disclosure may provide for connecting to a LAN via a cellular RAT.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access, (CDMA), time division multiple access (TDMA), frequency division multiple access (FDMA), orthogonal frequency-division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNodeB (eNB), Home NodeB, a Home eNodeB, a network node, an AN, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for connecting to a LAN via a cellular RAT. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   establishing, by a user equipment (UE), a signaling radio link with a cellular access node (AN) via a cellular radio access technology (RAT);
   transmitting, to a network node via the signaling radio link, a connectivity request comprising a connectivity type for establishing connectivity to a local area network (LAN);
   transmitting, to the network node via the signaling radio link, at least one parameter from a group consisting of an identifier of the UE, an Ethernet frame type, and an access point name;
   receiving an accept message indicating the connectivity type for establishing connectivity to the LAN, wherein the accept message comprises a radio resource control (RRC) connection reconfiguration message indicating acceptance of the connectivity request;
   establishing a data radio link with the cellular AN based at least in part on receiving the accept message indicating acceptance of the connectivity request; and
   establishing a data flow for exchanging data link layer packets with the LAN via the data radio link.

2. The method of claim 1, further comprising:
   transmitting a second connectivity request comprising a second connectivity type for establishing connectivity to one of the LAN and a second LAN;
   establishing a second data radio link with the cellular AN based at least in part on an acceptance of the second connectivity request; and
   establishing a second data flow for exchanging second data link layer packets with the LAN or the second LAN via the second data radio link.

3. The method of claim 1, further comprising:
   transmitting a second connectivity request comprising an Internet Protocol (IP) packet data network (PDN) type;
   establishing a second data radio link with the cellular AN based at least in part on an acceptance of the second connectivity request; and
   establishing a second data flow for exchanging second data link layer packets with an IP network via the second data radio link.

4. The method of claim 3, wherein the second data flow is associated with an IP address of the UE.

5. The method of claim 1, wherein the acceptance of the connectivity request is based at least in part on the at least one parameter.

6. The method of claim 1, wherein transmitting the at least one parameter further comprises transmitting the at least one parameter within the connectivity request.

7. The method of claim 1, wherein the data flow is associated with a first virtual LAN (VLAN) tag.

8. The method of claim 7, further comprising:
   establishing a second data flow based at least in part on the connectivity request, wherein the second data flow is associated with the identifier of the UE and a second VLAN tag;
   establishing a second data radio link, wherein the second data flow is associated with the second data radio link; and
   transmitting the first VLAN tag and the second VLAN tag to the network node.

9. The method of claim 1, wherein the connectivity type is an Ethernet PDN-type.

10. The method of claim 1, wherein the accept message further indicates at least one second parameter for specifying a configuration of data radio bearers.

11. A method of wireless communication comprising:
  establishing, by a cellular access node (AN), a signaling radio link with a user equipment (UE) via a cellular radio access technology (RAT);
  receiving, via the signaling radio link, a connectivity request for establishing connectivity to a local area network (LAN);
  receiving, via the signaling radio link, at least one parameter from a group consisting of an identifier of the UE, an Ethernet frame type, and an access point name;
  forwarding the connectivity request to a network node;
  receiving, from the network node, an accept message indicating the connectivity type for establishing connectivity to the LAN, wherein the accept message comprises a radio resource control (RRC) connection reconfiguration message indicating acceptance of the connectivity request;
  establishing a data radio link with the UE based at least in part on receiving the accept message indicating acceptance of the connectivity request from the network node; and
  forwarding data link layer packets of a data flow between the data radio link and a bridging function to the LAN.

12. The method of claim 11, further comprising:
  transmitting, to the network node, the identifier of the UE; and
  configuring the bridging function for communicating, to the LAN, data link layer packets that comprise the identifier.

13. The method of claim 11, further comprising:
  transmitting, to the network node, the identifier of the UE; and
  configuring the bridging function for communicating, to the LAN, data link layer packets that comprise the identifier and a first virtual LAN (VLAN) tag.

14. The method of claim 11, further comprising:
  establishing a second data radio link;
  configuring a second bridging function for communicating second data link layer packets that comprise the identifier and a second VLAN tag; and
  forwarding the second data link layer packets of a second data flow between the second data radio link and the second bridging function to the LAN.

15. The method of claim 11, further comprising:
  receiving and forwarding a second connectivity request to the network node;
  establishing a second data radio link based at least in part on receiving an acceptance of the second connectivity request from the network node; and
  forwarding second data link layer packets of a second data flow between the second data radio link and a second bridging function.

16. The method of claim 15, further comprising:
  transmitting, to the network node, a second identifier of the UE associated with the second data flow, and configuring the second bridging function with the second identifier.

17. The method of claim 11, further comprising:
  receiving a second connectivity request for establishing packet data network (PDN)-connectivity;
  forwarding the second connectivity request to the network node;
  establishing a second data radio link based at least in part on receiving an acceptance of the second connectivity request from the network node; and
  forwarding second data link layer packets of a second data flow between the second data radio link and a routing function.

18. The method of claim 11, wherein the connectivity type is an Ethernet PDN-type.

19. An apparatus for wireless communication comprising:
  means for establishing, by a user equipment (UE), a signaling radio link with a cellular access node (AN) via a cellular radio access technology (RAT);
  means for transmitting, to a network node via the signaling radio link, a connectivity request comprising a connectivity type for establishing connectivity to a local area network (LAN);
  means for receiving an accept message indicating the connectivity type for establishing connectivity to the LAN, wherein the accept message comprises a radio resources control (RRC) connection reconfiguration message indicating acceptance of the connectivity request;
  means for transmitting, to the network node via the signaling radio link, at least one parameter from a group consisting of an identifier of the UE, an Ethernet frame type, and an access point name;
  means for establishing a data radio link with the cellular AN based at least in part on receiving the accept message indicating acceptance of the connectivity request; and
  means for establishing a data flow for exchanging data link layer packets with the LAN via the data radio link.

20. The apparatus of claim 19, further comprising:
  means for transmitting a second connectivity request comprising a second connectivity type for establishing connectivity to one of the LAN and a second LAN;
  means for establishing a second data radio link with the cellular AN based at least in part on an acceptance of the second connectivity request; and
  means for establishing a second data flow for exchanging second data link layer packets with the LAN or the second LAN via the second data radio link.

21. The apparatus of claim 19, further comprising:
  means for transmitting a second connectivity request comprising an Internet Protocol (IP) packet data network (PDN) type;
  means for establishing a second data radio link with the cellular AN based at least in part on an acceptance of the second connectivity request; and
  means for establishing a second data flow for exchanging second data link layer packets with an IP network via the second data radio link.

22. The apparatus of claim 21, wherein the second data flow is associated with an IP address of the UE.

23. The apparatus of claim 19, wherein the acceptance of the connectivity request is based at least in part on the at least one parameter.

24. The apparatus of claim 19, wherein means for transmitting the at least one parameter further comprises means for transmitting the at least one parameter within the connectivity request.

25. The apparatus of claim 19, wherein the data flow is associated with a first virtual LAN (VLAN) tag.

26. The apparatus of claim 25, further comprising:
  means for establishing a second data flow based at least in part on the connectivity request, wherein the second data flow is associated with the identifier of the UE and a second VLAN tag;

means for establishing a second data radio link, wherein the second data flow is associated with the second data radio link; and means for transmitting the first VLAN tag and the second VLAN tag to the network node.

27. An apparatus for wireless communication comprising:
means for establishing, by a cellular access node (AN), a signaling radio link with a user equipment (UE) via a cellular radio access technology (RAT);
means for receiving, via the signaling radio link, a connectivity request for establishing connectivity to a local area network (LAN);
means for receiving, via the signaling radio link, at least one parameter from a group consisting of an identifier of the UE, an Ethernet frame type, and an access point name;
means for forwarding the connectivity request to a network node;
means for receiving, from the network node, an accept message indicating the connectivity type for establishing connectivity to the LAN, wherein the accept message comprises a radio resource control (RRC) connection reconfiguration message indicating acceptance of the connectivity request;
means for establishing a data radio link with the UE based at least in part on receiving the accept message indicating acceptance of the connectivity request from the network node; and
means for forwarding data link layer packets of a data flow between the data radio link and a bridging function to the LAN.

28. The apparatus of claim 27, further comprising:
means for transmitting, to the network node, the identifier of the UE; and
means for configuring the bridging function for communicating, to the LAN, data link layer packets that comprise the identifier.

29. The apparatus of claim 27, further comprising:
means for transmitting, to the network node, the identifier of the UE; and
means for configuring the bridging function for communicating, to the LAN, data link layer packets that comprise the identifier and a first virtual LAN (VLAN) tag.

30. The apparatus of claim 29, further comprising:
means for establishing a second data radio link;
means for configuring a second bridging function for communicating second data link layer packets that comprise the identifier and a second VLAN tag; and
means for forwarding the second data link layer packets of a second data flow between the second data radio link and the second bridging function to the LAN.

31. The apparatus of claim 27, further comprising:
means for receiving and forwarding a second connectivity request to the network node;
means for establishing a second data radio link based at least in part on receiving an acceptance of the second connectivity request from the network node; and
means for forwarding second data link layer packets of a second data flow between the second data radio link and a second bridging function.

32. The apparatus of claim 31, further comprising:
means for transmitting, to the network node, a second identifier of the UE associated with the second data flow, and configuring the second bridging function with the second identifier.

33. The apparatus of claim 27, further comprising:
means for receiving a second connectivity request for establishing packet data network (PDN)-connectivity;
means for forwarding the second connectivity request to the network node;
means for establishing a second data radio link based at least in part on receiving an acceptance of the second connectivity request from the network node; and
means for forwarding second data link layer packets of a second data flow between the second data radio link and a routing function.

34. An apparatus for wireless communication, comprising:
a processor;
memory in electronic communication with the processor; and
instructions stored in the memory and operable, when executed by the processor, to cause the apparatus to:
establish, by a user equipment (UE), a signaling radio link with a cellular access node (AN) via a cellular radio access technology (RAT);
transmit, to a network node via the signaling radio link, a connectivity request comprising a connectivity type for establishing connectivity to a local area network (LAN);
transmit, to the network node via the signaling radio link, at least one parameter from a group consisting of an identifier of the UE, an Ethernet frame type, and an access point name;
receive, from the network node via the signaling radio link, an accept message indicating the connectivity type for establishing connectivity to the LAN, wherein the accept message comprises a radio resources control (RRC) connection reconfiguration message indicating acceptance of the connectivity request;
establish a data radio link with the cellular AN based at least in part on receiving the accept message indicating acceptance of the connectivity request; and
establish a data flow for exchanging data link layer packets with the LAN via the data radio link.

35. The apparatus of claim 34, wherein the instructions are operable to cause the processor to:
transmit a second connectivity request comprising a second connectivity type for establishing connectivity to one of the LAN and a second LAN;
establish a second data radio link with the cellular AN based at least in part on an acceptance of the second connectivity request; and
establish a second data flow for exchanging second data link layer packets with the LAN or the second LAN via the second data radio link.

36. The apparatus of claim 34, wherein the instructions are operable to cause the processor to:
transmit a second connectivity request comprising an Internet Protocol (IP) packet data network (PDN) type;
establish a second data radio link with the cellular AN based at least in part on an acceptance of the second connectivity request; and
establish a second data flow for exchanging second data link layer packets with an IP network via the second data radio link.

37. The apparatus of claim 36, wherein the second data flow is associated with an IP address of the UE.

38. The apparatus of claim 34, wherein the acceptance of the connectivity request is based at least in part on the at least one parameter.

39. The apparatus of claim 34, wherein the connectivity request comprises the at least one parameter.

40. The apparatus of claim 34, wherein the data flow is associated with a first virtual LAN (VLAN) tag.

41. The apparatus of claim 40, wherein the instructions are operable to cause the processor to:
establish a second data flow based at least in part on the connectivity request, wherein the second data flow is associated with the identifier of the UE and a second VLAN tag;
establish a second data radio link, wherein the second data flow is associated with the second data radio link; and
transmit the first VLAN tag and the second VLAN tag to the network node.

42. An apparatus for wireless communication, comprising:
a processor;
memory in electronic communication with the processor; and
instructions stored in the memory and operable, when executed by the processor, to cause the apparatus to:
establish, by a cellular access node (AN), a signaling radio link with a user equipment (UE) via a cellular radio access technology (RAT);
receive, via the signaling radio link, a connectivity request for establishing connectivity to a local area network (LAN);
receive, via the signaling radio link, at least one parameter from a group consisting of an identifier of the UE, an Ethernet frame type, and an access point name;
forward the connectivity request to a network node;
receive, from the network node, an accept message indicating the connectivity type for establishing connectivity to the LAN, wherein the accept message comprises a radio resource control (RRC) connection reconfiguration message indicating acceptance of the connectivity request;
establish a data radio link with the UE based at least in part on receiving the accept message indicating acceptance of the connectivity request from the network node; and
forward data link layer packets of a data flow between the data radio link and a bridging function to the LAN.

43. The apparatus of claim 42, wherein the instructions are operable to cause the processor to:
transmit, to the network node, the identifier of the UE; and
configure the bridging function for communicating, to the LAN, data link layer packets that comprise the identifier.

44. The apparatus of claim 42, wherein the instructions are operable to cause the processor to:
transmit, to the network node, the identifier of the UE; and
configure the bridging function for communicating, to the LAN, data link layer packets that comprise the identifier and a first virtual LAN (VLAN) tag.

45. The apparatus of claim 42, wherein the instructions are operable to cause the processor to:
establish a second data radio link;
configure a second bridging function for communicating second data link layer packets that comprise the identifier and a second VLAN tag; and
forward the second data link layer packets of a second data flow between the second data radio link and the second bridging function to the LAN.

46. The apparatus of claim 42, wherein the instructions are operable to cause the processor to:
receive and forwarding a second connectivity request to the network node;
establish a second data radio link based at least in part on receiving an acceptance of the second connectivity request from the network node; and
forward second data link layer packets of a second data flow between the second data radio link and a second bridging function.

47. The apparatus of claim 46, wherein the instructions are operable to cause the processor to:
transmit, to the network node, a second identifier of the UE associated with the second data flow, and configuring the second bridging function with the second identifier.

48. The apparatus of claim 42, wherein the instructions are operable to cause the processor to:
receive a second connectivity request for establishing packet data network (PDN)-connectivity;
forward the second connectivity request to the network node;
establish a second data radio link based at least in part on receiving an acceptance of the second connectivity request from the network node; and
forward second data link layer packets of a second data flow between the second data radio link and a routing function.

49. A non-transitory computer-readable medium storing code for wireless communication, the code comprising instructions executable to:
establish, by a user equipment (UE), a signaling radio link with a cellular access node (AN) via a cellular radio access technology (RAT);
transmit, to a network node via the signaling radio link, a connectivity request comprising a connectivity type for establishing connectivity to a local area network (LAN);
transmit, to the network node via the signaling radio link, at least one parameter from a group consisting of an identifier of the UE, an Ethernet frame type, and an access point name;
receive an accept message indicating the connectivity type for establishing connectivity to the LAN, wherein the accept message comprises a radio resources control (RRC) connection reconfiguration message indicating acceptance of the connectivity request;
establish a data radio link with the cellular AN based at least in part on receiving the accept message indicating acceptance of the connectivity request; and
establish a data flow for exchanging data link layer packets with the LAN via the data radio link.

50. A non-transitory computer-readable medium storing code for wireless communication, the code comprising instructions executable to:
establish, by a cellular access node (AN), a signaling radio link with a user equipment (UE) via a cellular radio access technology (RAT);
receive, via the signaling radio link, a connectivity request for establishing connectivity to a local area network (LAN);
receive, via the signaling radio link, at least one parameter from a group consisting of an identifier of the UE, an Ethernet frame type, and an access point name;
forward the connectivity request to a network node;
receive, from the network node, an accept message indicating the connectivity type for establishing connectivity to the LAN, wherein the accept message comprises a radio resource control (RRC) connection reconfiguration message indicating acceptance of the connectivity request;

establish a data radio link with the UE based at least in part on receiving the accept message indicating acceptance of the connectivity request from the network node; and
forward data link layer packets of a data flow between the data radio link and a bridging function to the LAN.

\* \* \* \* \*